United States Patent
Nakai et al.

(10) Patent No.: US 12,422,063 B2
(45) Date of Patent: Sep. 23, 2025

(54) HOSE, METHOD FOR MANUFACTURING HOSE, AND HYDRAULIC PUMP

(71) Applicant: Mitsubishi Gas Chemical Company, Inc., Tokyo (JP)

(72) Inventors: Asami Nakai, Gifu (JP); Masataka Kaji, Kahoku (JP); Toshihiro Motochika, Kahoku (JP); Keisuke Ide, Kahoku (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 457 days.

(21) Appl. No.: 17/801,166

(22) PCT Filed: Feb. 26, 2021

(86) PCT No.: PCT/JP2021/007256
§ 371 (c)(1),
(2) Date: Aug. 19, 2022

(87) PCT Pub. No.: WO2021/172489
PCT Pub. Date: Sep. 2, 2021

(65) Prior Publication Data
US 2023/0107427 A1    Apr. 6, 2023

(30) Foreign Application Priority Data
Feb. 27, 2020   (JP) ................................. 2020-031354

(51) Int. Cl.
*F16L 11/08*   (2006.01)
*B29C 70/22*   (2006.01)
(Continued)

(52) U.S. Cl.
CPC ............ *F16L 11/085* (2013.01); *B29C 70/22* (2013.01); *B29C 70/30* (2013.01); *B29C 70/78* (2013.01);
(Continued)

(58) Field of Classification Search
CPC .... Y10T 442/2361; Y10T 442/20; C08J 5/04; C08J 2363/00; C08J 9/28; E04C 5/073; E04C 5/07; C08L 63/00; C08K 7/02
See application file for complete search history.

(56) References Cited

U.S. PATENT DOCUMENTS 5,960,834 A   10/1999   Sekido et al.
6,341,625 B1   1/2002   Maruyama et al.
(Continued)

FOREIGN PATENT DOCUMENTS

CN   105952990 A   9/2016
JP   48-047509 U1   6/1973
(Continued)

OTHER PUBLICATIONS

English machine translation for JPS6315734 (Jan. 22, 1988). (Year: 1988).*

(Continued)

*Primary Examiner* — Michael C Miggins
(74) *Attorney, Agent, or Firm* — Fitch, Even, Tabin & Flannery LLP

(57) ABSTRACT

Provided are a hose excelling in a lightweight property and in fatigue fracture resistance, a method for manufacturing the hose, and a hydraulic pump. The hose includes a tube, an interior of the tube being hollow, continuous carbon fibers and/or continuous glass fibers wound around an outer circumference of the tube, and a thermosetting resin present external to the tube. The thermosetting resin has an elastic modulus from 0.5 to 10 MPa, and the continuous carbon
(Continued)

fibers and/or continuous glass fibers are impregnated with at least a part of the thermosetting resin. The elastic modulus of the thermosetting resin is a numeric value determined by: heating the thermosetting resin for 2 hours at a curing temperature of the thermosetting resin; then subjecting the thermosetting resin to thermoregulation for two weeks under a condition of a temperature of 23° C. and a relative humidity of 55%; and then performing a measurement in accordance with JIS K7161:2019.

18 Claims, 3 Drawing Sheets

(51) Int. Cl.
| | | |
|---|---|---|
| B29C 70/30 | (2006.01) | |
| B29C 70/78 | (2006.01) | |
| B29K 63/00 | (2006.01) | |
| B29K 105/08 | (2006.01) | |
| B29K 277/00 | (2006.01) | |
| B29K 279/00 | (2006.01) | |
| B29K 307/04 | (2006.01) | |
| B29K 309/08 | (2006.01) | |
| B29K 627/06 | (2006.01) | |
| B29K 627/18 | (2006.01) | |
| B29L 23/00 | (2006.01) | |
| B32B 1/08 | (2006.01) | |
| B32B 5/02 | (2006.01) | |
| B32B 27/12 | (2006.01) | |
| B32B 27/30 | (2006.01) | |
| B32B 27/32 | (2006.01) | |

(52) U.S. Cl.
CPC ............... *B32B 1/08* (2013.01); *B32B 5/02* (2013.01); *B32B 27/12* (2013.01); *B32B 27/304* (2013.01); *B32B 27/322* (2013.01); B29K 2063/00 (2013.01); B29K 2105/0827 (2013.01); B29K 2277/00 (2013.01); B29K 2279/08 (2013.01); B29K 2307/04 (2013.01); B29K 2309/08 (2013.01); B29K 2627/06 (2013.01); B29K 2627/18 (2013.01); B29K 2995/0058 (2013.01); B29K 2995/0077 (2013.01); B29K 2995/0086 (2013.01); B29L 2023/22 (2013.01); B32B 2260/021 (2013.01); B32B 2260/046 (2013.01); B32B 2262/02 (2013.01); B32B 2262/0261 (2013.01); B32B 2262/101 (2013.01); B32B 2262/106 (2013.01); B32B 2262/14 (2013.01); B32B 2307/54 (2013.01); B32B 2307/552 (2013.01); B32B 2307/714 (2013.01); B32B 2597/00 (2013.01)

(56) References Cited

U.S. PATENT DOCUMENTS

| | | |
|---|---|---|
| 2011/0155310 A1 | 6/2011 | Cipielewski |
| 2012/0122360 A1* | 5/2012 | Costantino ................ C08J 5/04 |
| | | 264/171.13 |
| 2013/0217283 A1* | 8/2013 | Arai .................... C08G 59/3227 |
| | | 156/286 |
| 2016/0010246 A1 | 1/2016 | Nakai et al. |

FOREIGN PATENT DOCUMENTS

| | | |
|---|---|---|
| JP | 52-098221 U1 | 7/1977 |
| JP | 56-164291 A | 12/1981 |
| JP | 62-066083 U1 | 4/1987 |
| JP | 07-144372 A | 6/1995 |
| JP | 2001241570 A | 9/2001 |
| JP | 2010-144882 A | 7/2010 |
| JP | 2012-531481 A | 12/2012 |
| JP | 2014-173196 A | 9/2014 |
| JP | 2016-156464 A | 9/2016 |
| JP | 2019-171676 A | 10/2019 |
| WO | 9525633 A1 | 9/1995 |
| WO | 2011000646 A1 | 1/2011 |

OTHER PUBLICATIONS

EPO: Application No. 21760145.9; Extended European Search Report dated Apr. 6, 2023, 8 pages.
International Preliminary Report on Patentability and Written Opinion for PCT/JP2021/007256, mailed May 11, 2021, and English Translation submitted herewith (15 pages).
International Search Report for PCT/JP2021/007256, mailed May 11, 2021, and English Translation submitted herewith (7 pages).

* cited by examiner

HOSE, METHOD FOR MANUFACTURING HOSE, AND HYDRAULIC PUMP

CROSS-REFERENCE TO RELATED APPLICATIONS

This application is a U.S. national phase application filed under 35 U.S.C. § 371 of International Application Number PCT/JP2021/007256, filed Feb. 26, 2021, designating the United States, which claims priority from Japanese Application Number 2020-031354, filed Feb. 27, 2020.

FIELD OF THE INVENTION

The present invention relates to a hose, a method for manufacturing a hose, and a hydraulic pump.

BACKGROUND OF THE INVENTION

Hydraulic equipment and pneumatic equipment use the Pascal principle to convert a small force into a large force. These devices use a high-pressure fluid in hoses and therefore face problems such as the expansion and rupturing of the hoses due to the internal pressure. A stainless steel mesh hose (braided stainless steel hose) in which a tube made of resin is covered with a stainless steel mesh is known as a measure for dealing with such problems in a device that uses a high pressure fluid.

The stainless steel mesh hose is used in hose parts that require metal pipe-grade mechanical properties, such as brake hoses for automobiles, but fatigue fracture due to repeated bending is a problem with the stainless steel mesh hose. For example, as illustrated in FIG. 1, in a device such as a hydraulic pump, fatigue fracture is likely to occur at a portion of a connector 13 between a stainless steel mesh hose 11 and a body 12. In addition, the stainless steel mesh hose is constituted of metal and therefore heavy, and as the hose diameter becomes larger, weight increase becomes significant.

Therefore, the use of a fiber mesh in place of the stainless steel mesh hose is being examined. Specifically, Patent Document 1 discloses a hydraulic brake hose assembly including: a tube for carrying a liquid; a fiber mesh layer covering the tube; a first fitting at a first end of the covered tube covered by the fiber mesh layer; a second fitting at a second end of the covered tube; and a coating over the covered tube from the first end to the second end, covering a first point where the first fitting meets the covered tube and covering a second point where the second fitting meets the covered tube and further protecting the covered tube and the fittings.

CITATION LIST

Patent Documents

Patent Document 1: JP 2001-241570 A

SUMMARY OF INVENTION

As presented in Patent Document 1, when carbon fibers or glass fibers are used as tube-covering fibers on the tube for transporting a liquid, compared to a case where metal fibers or the like are used, the weight can be reduced, and the flexibility tends to improve. However, carbon fibers and glass fibers tend to break more easily than metal fibers or the like. In addition, it has been found that even when carbon fibers or glass fibers are used, the flexibility may be inferior. In particular, poor flexibility causes fatigue fractures at the portion of the connector.

Thus, an object of the present invention is to solve such problems and to provide a hose that excels in a lightweight property and has excellent resistance to fatigue fracture, a method for manufacturing the hose, and a hydraulic pump.

The present inventors conducted an examination on the basis of the problems described above, and discovered that the problems can be solved by winding continuous carbon fibers and/or continuous glass fibers around the outer circumference of a tube, and in addition, coating the fiber-wound tube with a thermosetting resin, and setting the elastic modulus of the thermosetting resin to a predetermined range. Specifically, the above problems can be solved by the following means.

<1> A hose including: a tube, an interior of the tube being hollow; continuous carbon fibers and/or continuous glass fibers wound around an outer circumference of the tube; and a thermosetting resin present external to the tube; in which the thermosetting resin has an elastic modulus from 0.5 to 10 MPa;

the continuous carbon fibers and/or continuous glass fibers are impregnated with at least a part of the thermosetting resin; and an elastic modulus of the thermosetting resin is a numeric value determined by: heating the thermosetting resin for 2 hours at a curing temperature of the thermosetting resin, subsequently subjecting the thermosetting resin to thermoregulation for two weeks under a condition of a temperature of 23° C. and a relative humidity of 55%; and then performing a measurement in accordance with JIS K7161:2019.

<2> The hose according to <1>, further including thermoplastic resin fibers wound around an outer circumference of the continuous carbon fibers and/or continuous glass fibers.

<3> The hose according to <2>, in which when a thermoplastic resin constituting the thermoplastic resin fibers is measured by a differential scanning calorimeter, the thermoplastic resin has a melting point, and the melting point is 180° C. or higher.

<4> The hose according to <2> or <3>, in which an evaluation score according to a snag test of the thermoplastic resin fibers is 2 or higher, the evaluation score according to the snag test being a numeric value obtained by measuring a knitted product of the thermoplastic resin fibers in accordance with the JIS L 1058:2019 D-1 method, and the knitted product being a test cloth produced using an 18-gauge tubular knitting machine from a combination of three thermoplastic resin fiber bundles of 50 denier/36 filaments.

<5> The hose according to any one of <2> to <4>, in which the thermoplastic resin fibers are wound around a surface of the continuous carbon fibers and/or the continuous glass fibers.

<6> The hose according to any one of <2> to <5>, in which, as a commingled yarn including the thermoplastic resin fibers and continuous reinforcing fibers, the thermoplastic resin fibers are wound around the outer circumference of the continuous carbon fibers and/or the continuous glass fibers.

<7> The hose according to any one of <2> to <6>, in which the thermoplastic resin constituting the thermoplastic resin fibers includes a polyamide resin.

<8> The hose according to any one of <2> to <6>, in which the thermoplastic resin constituting the thermoplastic resin fibers includes a polyamide resin constituted from a constituent unit derived from a diamine and a constituent unit derived from a dicarboxylic acid, 50 mol % or more of the constituent units derived from a diamine being derived from xylylene diamine.

<9> The hose according to any one of <2> to <8>, in which an elastic modulus of the thermoplastic resin constituting the thermoplastic resin fibers is from 15 times to 200 times an elastic modulus of the hose; the elastic modulus of the hose being a value determined by subjecting the hose to a tensile test under a condition of a distance between chucks of 60 mm and a rate of 20 mm/min, with other conditions being in accordance with JIS K7113:2019, and the elastic modulus of the thermoplastic resin being a numeric value determined by: drying an ISO test piece having a thickness of 4 mm for one hour at a temperature of 120° C.; and then performing a measurement in accordance with JIS K7161:2019.

<10> The hose according to any one of <2> to <9>, in which an elastic modulus of the thermoplastic resin constituting the thermoplastic resin fibers is 5000 times or less an elastic modulus of the thermosetting resin;
the elastic modulus of the thermoplastic resin being a numeric value determined by: drying an ISO test piece having a thickness of 4 mm for one hour at a temperature of 120° C.; and then performing a measurement in accordance with JIS K7161:2019.

<11> The hose according to any one of <2> to <10>, in which after one hour of heating at a curing temperature of the thermosetting resin, a difference between a thermal shrinkage ratio of the thermoplastic resin fibers and a thermal shrinkage ratio of the continuous carbon fibers and/or continuous glass fibers is 2% or less.

<12> The hose according to any one of <1> to <11>, in which the thermosetting resin includes an epoxy resin.

<13> The hose according to any one of <1> to <12>, in which the tube is a resin tube.

<14> The hose according to any one of <1> to <13>, in which the continuous carbon fibers and/or continuous glass fibers are wound in a braided state around the outer circumference of the tube.

<15> A method for manufacturing a hose, the method including:
winding continuous carbon fibers and/or continuous glass fibers around an outer circumference of a tube, an interior of the tube being hollow; and
applying a thermosetting resin from further outside than the continuous carbon fibers and/or continuous glass fibers, and impregnating the continuous carbon fibers and/or continuous glass fibers with at least a part of the thermosetting resin; in which
the thermosetting resin has an elastic modulus from 0.5 to 10 MPa; and
the elastic modulus of the thermosetting resin is a numeric value determined by: heating the thermosetting resin for 2 hours at a curing temperature of the thermosetting resin; then subjecting the thermosetting resin to thermoregulation for two weeks under a condition of a temperature of 23° C. and a relative humidity of 55%; and then performing a measurement in accordance with JIS K7161:2019.

<16> The method for manufacturing a hose according to <15>, further including winding, external to the tube and external to the continuous carbon fibers and/or continuous glass fibers, a filamentous material including thermoplastic resin fibers, and after the thermoplastic resin fibers have been wound, applying the thermosetting resin and impregnating the continuous carbon fibers and/or continuous glass fibers with at least a part of the thermosetting resin.

<17> The method for manufacturing a hose according to <16>, in which when a thermoplastic resin constituting the thermoplastic resin fibers is measured by a differential scanning calorimeter, the thermoplastic resin has a melting point, and a curing temperature of the thermosetting resin is lower than the melting point of the thermoplastic resin constituting the thermoplastic resin fibers.

<18> The method for manufacturing a hose according to <16> or <17>, in which a moisture content of the thermoplastic resin constituting the thermoplastic resin fibers, measured in accordance with JIS L 1096:2019, is 6% or less.

<19> A hydraulic pump having a hose described in any one of <1> to <14>.

According to the present invention, a hose excelling in a lightweight property and having excellent fatigue fracture resistance, a method for manufacturing the hose, and a hydraulic pump can be provided.

DESCRIPTION OF EMBODIMENTS

Hereinafter, embodiments for carrying out the present invention (hereinafter, referred to simply as "the present embodiment") will be described in detail. Note that the following present embodiments are examples for describing the present invention, and the present invention is not limited to the present embodiments.

In the present specification, "from . . . to . . . " or "of . . . to . . . " is used to mean that the numerical values described before and after "to" are included as the lower limit and the upper limit, respectively.

In the present specification, various physical property values and characteristic values are at 23° C. unless otherwise noted.

The hose of the present embodiment includes: a tube, an interior of the tube being hollow; continuous carbon fibers and/or continuous glass fibers wound around an outer circumference of the tube; and a thermosetting resin present external to the tube, and is characterized in that the thermosetting resin has an elastic modulus from 0.5 to 10 MPa, and the continuous carbon fibers and/or continuous glass fibers are impregnated with at least a part of the thermosetting resin. The elastic modulus of the thermosetting resin is a numeric value determined by heating the thermosetting resin for 2 hours at the curing temperature of the thermosetting resin, subsequently subjecting the thermosetting resin to thermoregulation for two weeks under a condition of a temperature of 23° C. and a relative humidity of 55%, and then performing a measurement in accordance with JIS K7161:2019.

Through such a configuration, a hose excelling in a lightweight property and having excellent fatigue fracture resistance can be obtained. That is, a lightweight hose with excellent flexibility can be obtained by setting the elastic modulus of the thermosetting resin to within a predetermined range. As a result, fatigue fractures can be effectively suppressed. Furthermore, a hose having excellent water resistance and corrosion resistance is obtained.

A hose of the present embodiment will be described below with reference to FIG. 2.

Figure 1:
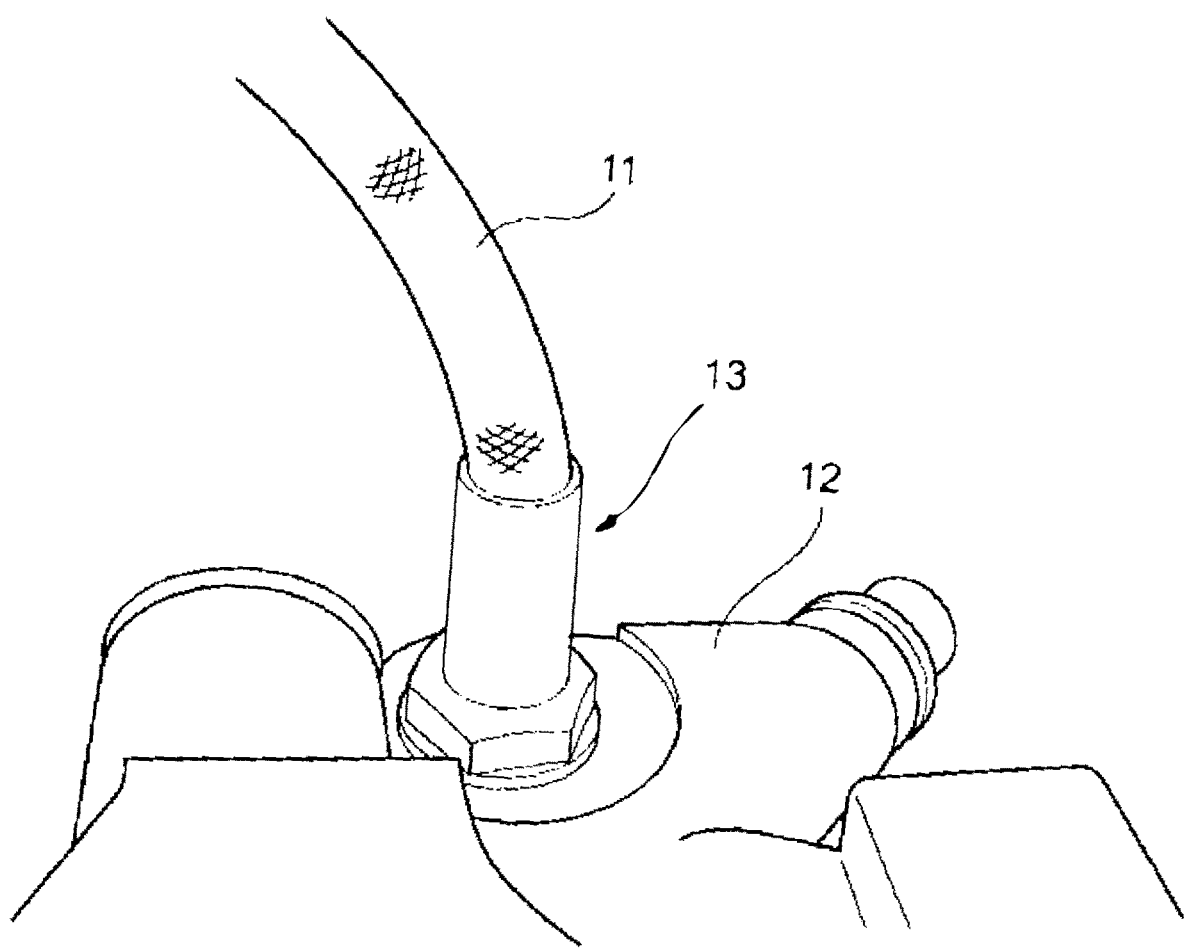
FIG. 1 is a schematic view illustrating a hydraulic pump using a known stainless steel mesh hose.
Figure 2:
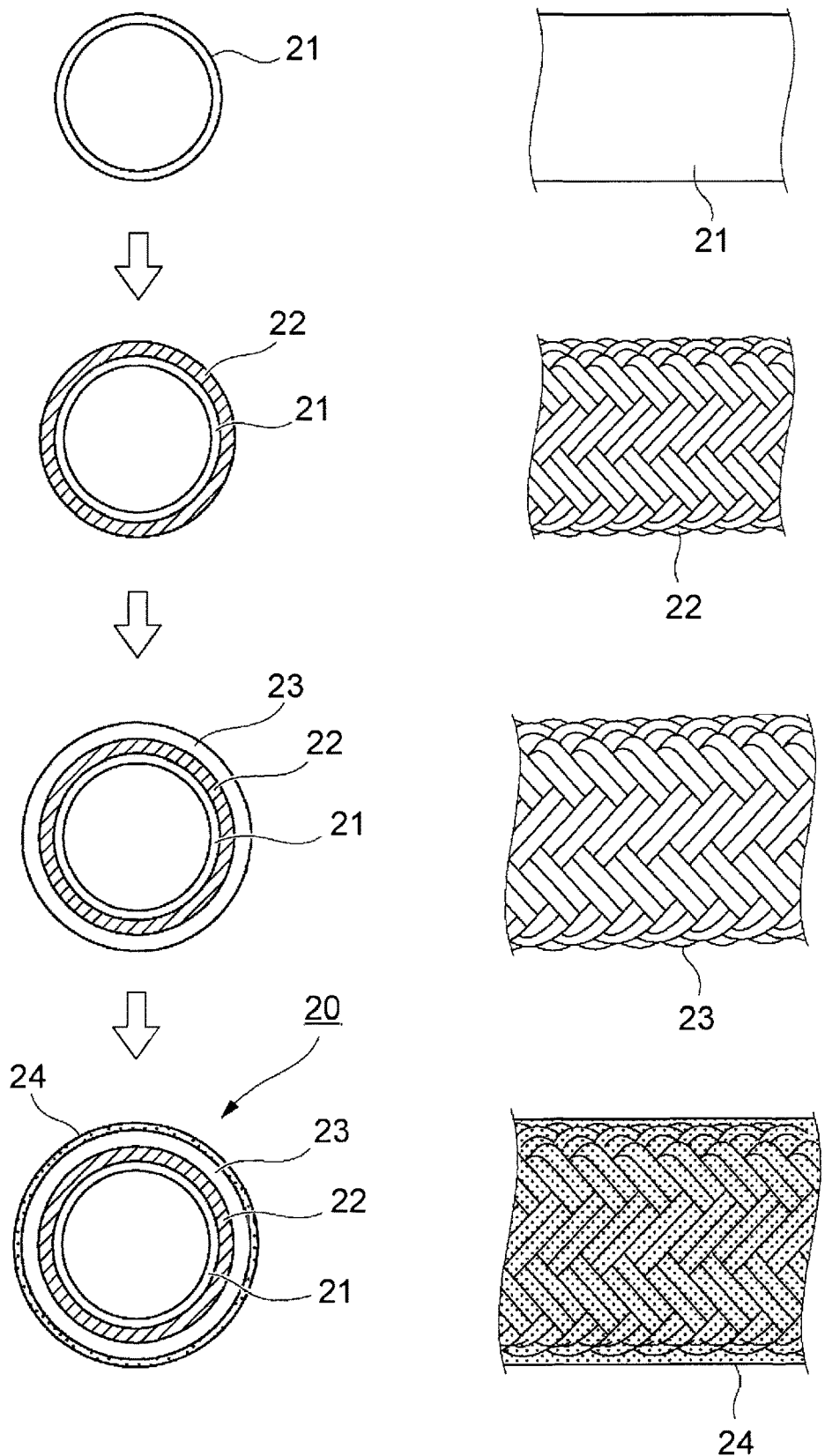
FIG. 2 is a schematic view illustrating an example of a process of manufacturing a hose of the present invention.

FIG. 2 is a schematic view illustrating an example of a process for manufacturing a hose according to the present embodiment. Reference numeral 20 indicates a hose, 21 indicates a tube, 22 indicates continuous carbon fibers and/or continuous glass fibers, 23 indicates thermoplastic resin fibers, and 24 indicates a thermosetting resin.

The hose of the present embodiment has a tube 21, the interior of which is hollow. The tube is a hollow elongated structure, also referred to as a tube. In the hose of the present embodiment, the tube usually configures the innermost layer, and a liquid or the like passes through the inner hollow section. A known tube may be used as the tube 21 as long as the tube does not depart from the spirit of the present embodiment. In the present embodiment, the tube 21 is preferably a resin tube. A resin tube is tube for which a main component of a material constituting the tube is a resin, and preferably, 80 mass % or more is a resin (preferably a thermoplastic resin), and more preferably 90 mass % or more is a resin. Polytetrafluoroethylene (PTFE), perfluoroalkoxy alkane (PFA), polypropylene, polyvinyl chloride (PVC), polyethylene, rubber, polyamide, or the like can be used as the resin constituting the resin tube, and polytetrafluoroethylene and polyvinyl chloride are preferable. The resin tube may be a tube made of resin with a coated surface. The resin tube may be a mixture of different resins described above, and may be a mixture of similar resins, such as a mixture of polyamide 6 and polyamide 12.

An inner diameter (diameter) of the tube 21 is preferably 4 mm or more, more preferably 5 mm or more, and even more preferably 5.5 mm or more. An upper limit of the inner diameter of the tube is preferably 20 mm or less, more preferably 18 mm or less, and even more preferably 16 mm or less, and may be 12 mm or less or 10 mm or less.

A thickness of the tube 21 is preferably 50 μm or more, more preferably 100 μm or more, and even more preferably 400 m or more, and is preferably 25 mm or less, more preferably 20 mm or less, and even more preferably 15 mm or less, and may be 10 mm or less, 5 mm or less, 3 mm or less, or 2 mm or less.

A length of the tube can be determined as appropriate according to the application, but is usually 50 mm or longer and not longer than 50000 mm.

Returning to FIG. 2 again, in the hose according to the present embodiment, continuous carbon fibers and/or continuous glass fibers 22 are wound around an outer circumference of the tube 21. The continuous carbon fibers and/or continuous glass fibers are wound around the outer circumference of the tube 21, and thus a hose having excellent corrosion resistance can be obtained, unlike a case where a metal mesh or the like is used. Also, a hose excelling in a lightweight property can be obtained. The continuous carbon fibers and/or continuous glass fibers may be continuous carbon fibers alone, continuous glass fibers alone, or a mixed yarn of the continuous carbon fibers and the continuous glass fibers. At this time, the continuous carbon fibers and the continuous glass fibers may be non-twisted or may be a twisted yarn. Furthermore, an aspect may be such that the continuous carbon fibers are wound, after which the continuous glass fibers are wound, or may be such that the continuous glass fibers are wound, after which the continuous carbon fibers are wound. In the hose of the present embodiment, continuous carbon fibers are preferably used.

Here, the outer circumference of the tube 21 means "external to the tube 21 and around the tube 21". The outer circumference may be the surface of the tube 21, or may have a layer interposed therebetween. In the present embodiment, the continuous carbon fibers and/or the continuous glass fibers are preferably wound around the surface of the tube 21.

Figure 3:
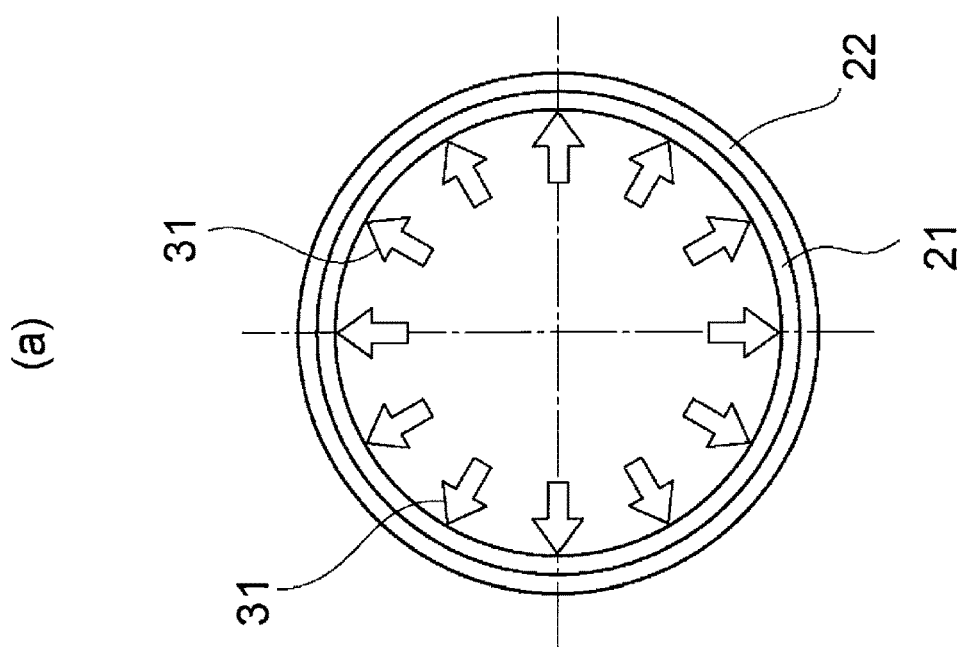
FIG. 3 is a schematic view illustrating a state in which continuous carbon fibers and/or continuous glass fibers are wound on the outer circumference of a tube.
Figure 3:
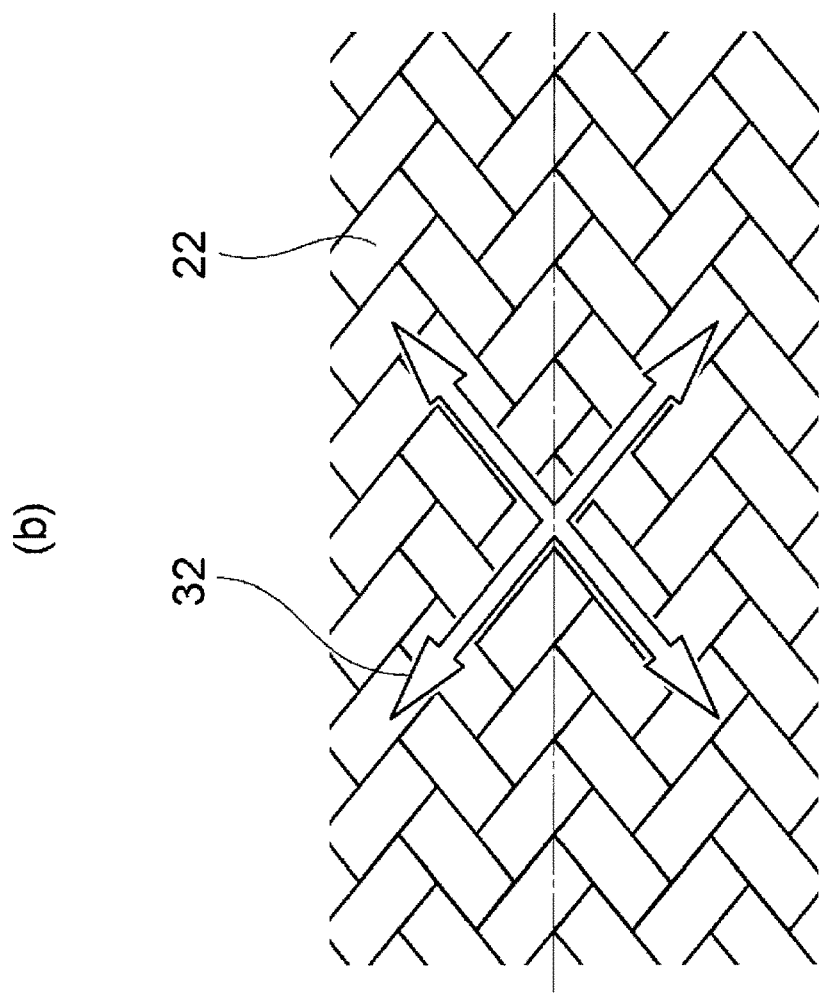

Here, since the carbon fibers have extremely high strength in the tensile direction, the carbon fibers are beneficial as a reinforcing material of the tube 21 in the present embodiment. This point is described with reference to FIG. 3. FIG. 3 is a schematic view illustrating a state in which the continuous carbon fibers 22 are wound around the outer circumference of the tube 21, and the reference numerals of the tube 21 and the continuous carbon fibers 22 are the same as in FIG. 2. FIG. 3(a) is a diagram illustrating the continuous carbon fibers 22 wound around the outer circumference of the tube 21, and illustrates a cross section perpendicular to the longitudinal direction of the tube 21. When a liquid passes through the tube, and the interior of the tube 21 receives an internal pressure 31, and a tensile force 32 acts on the continuous carbon fibers 22 wound around the outer circumference of the tube 21, to counteract the internal pressure 31. The image of FIG. 3(b) illustrates the this state from the outside of the tube 21. In other words, FIG. 3(b) is a diagram illustrating an appearance of the continuous carbon fibers 22 wound around the outer circumference of the tube 21. When an internal pressure acts on the tube 21, the tensile force acts on the continuous carbon fibers 22 to counteract the internal pressure, and the tube 21 is protected.

Referring to FIG. 2, "the continuous carbon fibers and/or the continuous glass fibers 22 are wound around the outer circumference of the tube 21" means that the continuous carbon fibers and/or the continuous glass fibers 22 are, for example, wound spirally in the longitudinal direction of the tube 21, and are usually wound in an S-direction (S winding) or a Z-direction (Z winding). The continuous carbon fibers and/or the continuous glass fibers 22 may also be wound in both the S-direction and the Z-direction. Furthermore, the continuous carbon fibers and/or the continuous glass fibers 22 may be wound to overlap only in the S-direction or the Z-direction. An angle (spiral angle) of winding of the continuous carbon fibers and/or the continuous glass fibers 22 is preferably from ±20 to ±80 degrees relative to the direction perpendicular to the longitudinal central axis of the tube 21. Additionally, with the hose of the present embodiment, the continuous carbon fibers and/or the continuous glass fibers 22 are preferably wound around the outer circumference of the tube 21 with substantially no gaps. "Substantially no gaps" means that the continuous carbon fibers and/or the continuous glass fibers 22 cover a region of 90% or more of the surface area of the outer circumference of the tube 21.

The continuous carbon fibers and/or continuous glass fibers 22 may be wound as is as single fibers of continuous carbon fibers and/or continuous glass fibers, or as a bundle of continuous carbon fibers and/or continuous glass fibers, or may be wound as a braid, a twisted string or a folded string. In the present embodiment, the continuous carbon fibers and/or the continuous glass fibers 22 are preferably wound around the outer circumference of the tube 21 in a braided state. The braid in the present embodiment is a string in which single fibers of continuous carbon fibers and/or continuous glass fibers, or bundles of continuous carbon fibers and/or continuous glass fibers are combined, and the braid is also referred to as an "uchihimo". The braid is preferably a string formed by using bundled continuous carbon fibers and/or bundled continuous glass fibers (for example, bundles of around 24 to 108 fibers) as a single unit, aligning three or more units of these, and crossing these units diagonally according to a certain regularity. The number of units configuring the braid is preferably 4 units or more, and more preferably 8 units or more, and is also preferably 200 units or less, more preferably 100 units or less, and even more preferably 50 units or less. The number of units may also be 20 units or 10 units or less. A single type of continuous carbon fibers and/or continuous glass fibers configuring the braid may be used, or two or more types may be used. A braid is known as a string that is stretchable, and is preferable because the braid is not overly strong, is not overly weak, and can flexibly respond to changes in internal pressure of the tube 21.

In addition, adjusting the angle of braiding can increase a degree of freedom in design in terms of rigidity. That is, making an intersection angle of braiding to an acute angle makes the hose flexible, and making an intersection angle of braiding to an obtuse angle makes the hose rigid.

In the present embodiment, the continuous carbon fibers and/or the continuous glass fibers are carbon fibers or glass fibers having a number average fiber length of 20 mm or longer, preferably 10 cm or longer, even more preferably 20 cm or longer, and yet even more preferably 1 m or longer. Although an upper limit is not particularly stipulated, from a practical perspective, in the present embodiment, the number average fiber length is not more than 10 times the length of the hose.

Furthermore, a number average fiber diameter of a single fiber of the continuous carbon fibers and/or continuous glass fibers is preferably from 1 µm to 50 µm. Also, the continuous carbon fibers and/or continuous glass fibers may be used as a fiber bundle, and in this case, the number of bundled fibers constituting the fiber bundle is from 100 to 24000.

The continuous glass fibers are preferably E glass, but may be D glass, R glass, S glass, or the like.

When heated at the curing temperature of the thermosetting resin for 1 hour, the continuous carbon fibers and/or continuous glass fibers used in the present embodiment preferably have a thermal shrinkage ratio of 2% or less and −2% or more, more preferably 1% or less and −1% or more, even more preferably 0.5% or less and −0.5% or more, yet even more preferably 0.2% or less and −0.2% or more, still even more preferably 0.1% or less and −0.1% or more, and even further preferably 0.01% or less and −0.01% or more. A lower limit of the thermal shrinkage ratio is preferably 0%.

The thermal shrinkage ratio is measured according to the disclosure in the Examples below.

As the continuous carbon fibers and/or continuous glass fibers 22 used in the present embodiment, fibers treated with a treatment agent are preferably used. Examples of such treatment agents include sizing agents and surface treatment agents, and those described in paragraphs [0093] and [0094] of JP 4894982 B, the contents of which are incorporated in the present specification, are preferably used.

In a case where the thermosetting resin is an epoxy resin, the treatment agent of the continuous carbon fibers and/or continuous glass fibers is preferably an epoxy resin.

In the hose of the present embodiment, a total content of the continuous carbon fibers and/or continuous glass fibers 22 in the hose preferably accounts for 5 mass % or more, more preferably 8 mass % or more, and even more preferably 10 mass % or more. The total content of the continuous carbon fibers and/or continuous glass fibers 22 in the hose also preferably accounts for 50 mass % or less, more preferably 40 mass % or less, even more preferably 30 mass % or less, yet even more preferably 25 mass % or less, and still even more preferably 20 mass % or less.

The continuous carbon fibers and/or continuous glass fibers in the present embodiment may include only one type, or two or more types. In a case where the continuous carbon fibers and/or continuous glass fibers contain two or more types, the total amount is preferably in the above range.

In FIG. 2, the hose 20 according to the present embodiment preferably further includes thermoplastic resin fibers 23 wound around the outer circumference of the continuous carbon fibers and/or continuous glass fibers 22.

When the continuous carbon fibers and/or continuous glass fibers are on the outermost surface of the hose, the continuous carbon fibers and/or the continuous glass fibers may be prone to breakage due to rubbing between hoses or impact by debris bouncing up from the road surface in automotive applications. Therefore, in a related art, a technique of coating the continuous carbon fibers and/or continuous glass fibers with urethane or covering another resin hose has been adopted. However, this technique has design related disadvantages because covering with another resin hose adds another process, increases the cost, and also increases the volume. However, in the present embodiment, the disadvantages can be effectively eliminated by winding thermoplastic resin fibers around the outer side of the continuous carbon fibers and/or continuous glass fibers. Furthermore, winding the thermoplastic resin fibers imparts slidability to the hose, and thus suppressing degradation due to vibration and rubbing between hoses, and at the same time, improving operability.

Here, the outer circumference of the continuous carbon fibers and/or continuous glass fibers 22 means "external to the continuous carbon fibers and/or continuous glass fibers 22 and around the continuous carbon fibers and/or continuous glass fibers 22", and may be the surface of the outer circumference of the continuous carbon fibers and/or continuous glass fibers, or something may be interposed therebetween. In the present embodiment, preferably, thermoplastic resin fibers 23 are wound around the outer circumferential surface of the continuous carbon fibers and/or continuous glass fibers 22. Here, in a case where the continuous carbon fibers and/or continuous glass fibers have a coating agent such as a treatment agent, or a coating layer, the surface of the continuous reinforcing fibers 22 is a surface of the coating agent or a surface of the coating layer.

Winding of the thermoplastic resin fibers 23 means, for example, spirally winding in the longitudinal direction of the tube 21. Further, the thermoplastic resin fibers 23 are usually wound in the S-direction (S winding) or the Z-direction (Z winding). The thermoplastic resin fibers 23 may also be wound in both the S-direction and the Z-direction. Winding the thermoplastic resin fibers 23 in both the S-direction and the Z-direction can more effectively suppress the possibility of rough twilling (a phenomenon in which the fibers of an upper layer bite into the fibers of a lower layer and break the fibers). Furthermore, the thermoplastic resin fibers 23 may be wound so as to overlap only in the S-direction or the Z-direction. In a preferable aspect, the thermoplastic resin fibers 23 are wound so as to overlap only in the S-direction or the Z-direction.

The angle (spiral angle) of the winding of the thermoplastic resin fibers 23 is preferably from ±20 to ±80 degrees relative to the direction perpendicular to the longitudinal central axis of the tube 21. Additionally, with the hose of the present embodiment, the thermoplastic resin fibers 23 are preferably wound around the outer circumference of the tube 21 with substantially no gaps. "Substantially no gaps" means that the thermoplastic resin fibers 23 cover a region of 90% or more of the surface area of the outer circumference of the tube 21.

In the present embodiment, bundles of continuous thermoplastic resin fibers may be wound around the outer circumference of the continuous carbon fibers and/or continuous glass fibers, or a filamentous material including the thermoplastic resin fibers may be wound around the outer circumference of the continuous carbon fibers and/or continuous glass fibers.

The continuous thermoplastic resin fibers are thermoplastic resin fibers having a number average fiber length of 20 mm or longer, preferably 10 cm or longer, and more preferably 20 cm or longer, and the number average fiber length may be 50 cm or longer or even 1 m or longer. Although an upper limit is not particularly stipulated, from a practical perspective, in the present embodiment, the number average fiber length of the continuous thermoplastic resin fibers is not more than 10 times the length of the hose.

A thermal shrinkage ratio of the thermoplastic resin fibers used in the present embodiment is preferably 3% or less, more preferably 2% or less, even more preferably 1.5% or less, yet even more preferably 1.3% or less, and still even more preferably 1.05% or less. A lower limit of the thermal shrinkage ratio is ideally 0, but may be 0.1% or higher.

The thermal shrinkage ratio is measured according to the disclosure in the Examples below.

Examples of aspects in which the filamentous material including the thermoplastic resin fibers is wound around the outer circumference of the continuous carbon fibers and/or continuous glass fibers include a braid, a twisted string, a woven string, a covering yarn, and a commingled yarn, each including thermoplastic resin fibers, and a braid is preferable. When the filamentous material including the thermoplastic resin fibers is in the form of a braid, flexibility tends to be better. In the braid, the twisted string, the woven string, or the like, the fiber component may be constituted from only thermoplastic resin fibers (preferably continuous thermoplastic resin fibers), or may be constituted from a filamentous material composed of thermoplastic resin fibers and continuous carbon fibers and/or continuous glass fibers. Furthermore, the filamentous material may be a filamentous material constituted from thermoplastic resin fibers, continuous carbon fibers and/or continuous glass fibers, and another fibrous material. In addition, the filamentous material may include, for example, a treatment agent for forming the fibers into a filamentous form.

The thermoplastic resin fibers in the hose of the present embodiment are preferably present as a braid of the thermoplastic resin fibers and/or a braid of a commingled yarn, and are more preferably a braid of thermoplastic resin fibers.

In the present embodiment, the braid of thermoplastic resin fibers or the braid of a commingled yarn is a string formed by combining bundles of thermoplastic resin fibers and/or commingled yarn, and is also referred to as an "uchihimo". The braid is preferably a string formed by using bundled thermoplastic resin fibers and/or commingled yarn as a single unit, aligning three or more units thereof, and crossing these units diagonally according to a certain regularity. The number of units configuring the braid is preferably 4 units or more, and more preferably 8 units or more, and is also preferably 500 units or less, and more preferably 450 units or less. A single type of braid of a thermoplastic resin fibers constituting the braid or a single type of braid of commingled yarn may be used, or two or more types may be used. A braid is known as a string that is stretchable, and is preferable because the braid is not overly strong, is not overly weak, and can flexibly respond to changes in the shape of the tube 21.

An example of a preferred embodiment of a commingled yarn containing thermoplastic resin fibers is a commingled yarn constituted from continuous carbon fibers and/or continuous glass fibers and the thermoplastic resin fibers. In the present embodiment, commingled yarn refers to a yarn in which continuous carbon fibers and/or continuous glass fibers, and thermoplastic resin fibers (preferably, continuous thermoplastic resin fibers) are aligned generally parallel to the longitudinal direction of the fibers, and the continuous carbon fibers and/or continuous glass fibers, and the thermoplastic resin fibers are dispersed in a cross-sectional direction perpendicular to the longitudinal direction of the commingled yarn. Here, "generally parallel" does not mean parallel in the geometric sense, but includes what can be said to be normally parallel in the technical field of the present invention. For example, a configuration in which fiber bundles of continuous thermoplastic resin fibers and fiber bundles of continuous carbon fibers and/or continuous glass fibers are formed as a single bundle while being opened can be said to be generally parallel.

In the commingled yarn used in the present embodiment, preferably 95 mass % or more, more preferably 97 mass % or more, and even more preferably greater than 90 mass % of the commingled yarn is constituted by continuous carbon fibers and/or continuous glass fibers, and continuous thermoplastic resin fibers. In addition, the total amount (100 mass %) of the commingled yarn may be constituted by continuous carbon fibers and/or continuous glass fibers, and continuous thermoplastic resin fibers. The commingled yarn preferably has a ratio of impregnation of the thermoplastic resin fibers into the continuous carbon fibers and/or continuous glass fibers from 0 to 20%. When the ratio of impregnation is set to the lower limit or higher, impregnation during molding proceeds more effectively.

The ratio of impregnation is preferably 1% or higher, and may be 2% or higher. The ratio of impregnation is preferably 18% or less, more preferably 15% or less, and even more preferably 10% or less.

In the commingled yarn used in the present embodiment, a degree of dispersion of the continuous carbon fibers and/or continuous glass fibers in the continuous thermoplastic resin fibers is preferably 90% or higher, more preferably 91% or higher, even more preferably 92% or higher, and yet even more preferably 93% or higher. The upper limit may be 100%, or may be 99% or less. When the degree of dispersion is set to such a high value in this manner, fraying, sagging, and breakage can be effectively suppressed. In the present embodiment, the degree of dispersion is an indicator of whether the continuous reinforcing fibers and the continuous thermoplastic resin fibers are uniformly mixed, and as the value of the degree of dispersion approaches 100%, the fibers are more uniformly mixed.

In the present embodiment, the degree of dispersion is a value measured as follows.

The commingled yarn is cut up and embedded in an epoxy resin. A cross section perpendicular to the longitudinal direction of the embedded commingled yarn is polished, and an image of the cross section is captured using an ultra-deep color 3D shape measurement microscope (for example, the VK-9500 3D laser scanning microscope (controller part)/VK-9510 (measurement part) (available from Keyence Corporation)). In the captured image of the cross section, six auxiliary lines are drawn radially at equal intervals, and lengths of the continuous reinforcing fiber regions along each auxiliary line are measured as a1, a2, a3, . . . ai (i=n). In addition, lengths of the continuous thermoplastic resin fiber regions along each auxiliary line are measured as b1, b2, b3, . . . bi (i=m). The degree of dispersion is then calculated using the following equation.

$$\left[1 - \left(\frac{1}{n \text{ or } m} \times \frac{\sum_{i=1}^{n \text{ or } m}(a_i \text{ or } b_i)}{\sum_{i=1}^{n \text{ or } m}(a_i) + \sum_{i=1}^{n \text{ or } m}(b_i)}\right)\right] \times 100(\%)$$

Also, the ratio of impregnation of the commingled yarn of the present embodiment is a value measured according to the following method.

The commingled yarn is cut up and embedded in an epoxy resin. A cross section perpendicular to the longitudinal direction of the embedded commingled yarn is polished, and an image of the cross section is captured using an ultra-deep color 3D shape measurement microscope (for example, the VK-9500 laser scanning microscope (controller part)/VK-9510 (measurement part) (available from Keyence Corporation)). In the obtained cross-sectional image, a region of impregnation of a component derived from the continuous thermoplastic resin fibers into the continuous reinforcing fibers, where the component derived from the continuous thermoplastic resin fibers is melted and impregnated, is selected using image analysis software (for example, ImageJ), and the area of the region is measured. The ratio of impregnation is calculated as the (region of impregnation of the component derived from the continuous thermoplastic resin fibers composition into the continuous reinforcing fibers)/(the captured cross-sectional area) (unit: %). The region of impregnation refers to a region, between continuous carbon fibers and/or continuous glass fibers, in which the thermoplastic resin fibers are melted and no longer in a fibrous form, and the melted thermoplastic resin fibers are bonded to the continuous carbon fibers and/or the continuous glass fibers. That is, the region of impregnation means a region of continuous carbon fibers and/or continuous glass fibers with molten thermoplastic resin present therebetween. Also, while not typical, in a case where a fibrous thermoplastic resin remains in the molten thermoplastic resin, the region of impregnation also includes the portion thereof.

The continuous carbon fibers and/or the continuous glass fibers used in the commingled yarn are preferably the same as the continuous carbon fibers and/or the continuous glass fibers that are wound around the outer circumference of the tube described above.

Furthermore, the thermoplastic resin fibers used in the hose of the present embodiment preferably have high snag resistance. Specifically, in the present embodiment, an evaluation score according to a snag test of the thermoplastic resin fibers is preferably 2 or higher, more preferably 3 or higher, and even more preferably 3.5 or higher. With the thermoplastic resin fibers with the evaluation score according to the snag test of 2 or higher, breakage of the continuous reinforcing fibers can be more effectively suppressed. Here, the evaluation score according to a snag test is a numeric value determined by measurement of a knitted product of the thermoplastic resin fibers in accordance with the JIS L 1058:2019 D-1 method. The knitted product is a test cloth produced by knitting a combination of three thermoplastic resin fiber bundles of 50 denier/36 filaments, using an 18-gauge tubular knitting machine. More specifically, the measurement is implemented in accordance with the method described in the Examples below.

The continuous thermoplastic resin fibers of the present embodiment may be formed from a thermoplastic resin composition. The thermoplastic resin composition may be formed from only one or more types of thermoplastic resins, or may also include other components.

Examples of thermoplastic resins that can be used include polyolefin resins such as polyethylene and polypropylene, polyamide resins, polyester resins such as polyethylene terephthalate and polybutylene terephthalate, polycarbonate resins, polyoxymethylene resins (polyacetal resins), polyether ketone resins such as polyether ketone, polyether ether ketone, polyether ketone ketone, and polyether ether ketone ketone, polyether sulfone resins, polyether sulfide resins, polyphenylene sulfide resins, and thermoplastic polyimide resins such as thermoplastic polyether imides, thermoplastic polyamide imides, wholly aromatic polyimides and semi-aromatic polyimides. The thermoplastic resin composition preferably includes at least one type of thermoplastic resin selected from polyamide resins and polyolefin resins, and more preferably includes a polyamide resin.

Examples of the polyamide resin used in the present embodiment include polyamide 4, polyamide 6, polyamide 11, polyamide 12, polyamide 46, polyamide 66, polyamide 610, polyamide 612, poly(hexamethylene terephthalamide) (polyamide 6T), poly(hexamethylene isophthalamide) (polyamide 6I), polyamide 66/6T, polyxylylene adipamide, polyxylylene sebacamide, polyxylylene dodecamide, polyamide 9T, polyamide 9MT, and polyamide 6I/6T.

In particular, the polyamide resin is preferably a resin in which moisture does not easily foam when heated for 20 minutes at the curing temperature of the thermosetting resin described below, that is, preferably a low water-absorbing polyamide resin. Among polyamide resins like those described above, from the perspectives of moldability and heat resistance, a polyamide resin constituted from a constituent unit derived from a diamine and a constituent unit derived from a dicarboxylic acid, 50 mol % or greater of the constituent units derived from a diamine being derived from xylylene diamine, is preferable (the polyamide resin thereof may be referred to below as an "XD-based polyamide"). The use of the XD-based polyamide can produce a hose excelling in water resistance.

Furthermore, in a case where the thermoplastic resin used in the present embodiments is a mixture of polyamide resins, a proportion of XD-based polyamides in the polyamide resin is preferably 50 mass % or more, more preferably 80 mass % or more, even more preferably 90 mass % or more, and particularly preferably 95 mass % or more.

In the XD-based polyamide, preferably 70 mol % or more, more preferably 80 mol % or more, even more preferably 90 mol % or more, and yet even more preferably 95 mol % or more, of the constituent units derived from a diamine are derived from xylylenediamine, and preferably 50 mol % or more, more preferably 70 mol % or more, even more preferably 80 mol % or more, yet even more preferably 90 mol % or more, and yet even more preferably 95 mol % or more, of the constituent units derived from a dicarboxylic acid are derived from an α,ω-linear aliphatic dicarboxylic acid preferably having from 4 to 20 carbons.

The xylylenediamine preferably includes at least m-xylylenediamine, more preferably includes from 30 to 100 mol % of m-xylylenediamine and from 70 to 0 mol % of p-xylylenediamine, and even more preferably from 50 to 100 mol % of m-xylylenediamine and from 50 to 0 mol % of p-xylylenediamine.

A diamine that can be used as the raw material diamine component of the XD-based polyamide other than meta-xylylenediamine and para-xylylenediamine can be exemplified by aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, para-phenylenediamine, and bis(aminomethyl)naphthalene. One of these can be used, or two or more types can be mixed and used.

In a case where a diamine besides xylylenediamine is used as the diamine component, the proportion of such a diamine is less than 50 mol %, preferably 30 mol % or less, more preferably from 1 to 25 mol %, and particularly preferably from 5 to 20 mol % of the diamine-derived constituent unit.

Examples of the α,ω-linear aliphatic dicarboxylic acid having from 4 to 20 carbon atoms that is preferably used as the raw material dicarboxylic acid component of the polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. One type thereof can be used, or two or more types thereof can be mixed and used. Among these, adipic acid and/or sebacic acid is preferable, and sebacic acid is more preferable.

Examples of dicarboxylic acid components other than the α,ω-linear aliphatic dicarboxylic acid having from 4 to 20 carbons include phthalic acid compounds, such as isophthalic acid, terephthalic acid, and ortho-phthalic acid; naphthalenedicarboxylic acid, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One of these can be used alone, or two or more types can be mixed and used.

In a case where a dicarboxylic acid besides the α,ω-linear aliphatic dicarboxylic acid having from 4 to 20 carbons is used as a dicarboxylic acid component, terephthalic acid and isophthalic acid may be used from the viewpoint of moldability. In a case where terephthalic acid and isophthalic acid are used, the proportions of the terephthalic acid and isophthalic acid are each preferably 30 mol % or less, more preferably from 1 to 30 mol %, and particularly preferably from 5 to 20 mol %, of the constituent units derived from dicarboxylic acid.

In the present embodiment, "being constituted from a constituent unit derived from a diamine and a constituent unit derived from a dicarboxylic acid" means that these components are used as main components, but constituent units other than these are not entirely excluded, and the polyamide resin may contain a constituent unit derived from a lactam such as ε-caprolactam or laurolactam, or from an aliphatic aminocarboxylic acid such as aminocaproic acid and aminoundecanoic acid. In the present embodiment, the total of the constituent units derived from a diamine and constituent units derived from a carboxylic acid in the polyamide resin preferably accounts for 90 mass % or more, more preferably 95 mass % or more, and even more preferably 99 mass % or more, of the total constituent units.

One embodiment of the polyamide resin used in the present embodiment is an aspect in which 80 mol % or more of the constituent units derived from a diamine are derived from meta-xylylenediamine, and 80 mol % or more of the constituent units derived from a dicarboxylic acid are derived from adipic acid.

A second embodiment of the polyamide resin used in the present embodiment is an aspect in which, of the constituent units derived from a diamine, from 10 to 90 mol % are derived from meta-xylylenediamine, and from 90 to 10 mol % are derived from para-xylylenediamine, and 80 mol % or more of the constituent units derived from a dicarboxylic acid are derived from sebacic acid.

A number average molecular weight (Mn) of the polyamide resin used in the present embodiment is preferably from 6000 to 30000, more preferably from 8000 to 28000, even more preferably from 9000 to 26000, yet even more preferably from 10000 to 24000, and yet even more preferably from 11000 to 22000. When the number average molecular weight is in such a range, the heat resistance, dimensional stability, and moldability of the obtained hose are further improved.

Note that the number average molecular weight (Mn) herein is calculated based on a terminal amino group concentration [NH$_2$] (μeq/g) and a terminal carboxyl group concentration [COOH] (μeq/g) of the polyamide resin, using the following equation. Number average molecular weight (Mn)=2000000/([COOH]+[NH$_2$])

For the method of producing the polyamide resin, the description in the paragraphs [0052] and [0053] of JP 2014-173196 A, the contents of which are incorporated herein, can be referenced.

The thermoplastic resin constituting the thermoplastic resin fibers used in the present embodiment preferably has a melting point when measured by a differential scanning calorimeter, and the melting point is preferably 180° C. or higher, and is preferably 350° C. or lower. The thermoplastic resin tends to have better heat resistance when the its melting point is equal to or more than the lower limit described above. Furthermore, the thermoplastic resin tends to have better moldability when its melting point is equal to or less than the upper limit described above.

The melting point is preferably 190° C. or higher, more preferably 200° C. or higher, and even more preferably 210° C. or higher. The melting point is also preferably 325° C. or lower, more preferably 320° C. or lower, and even more preferably 315° C. or lower, and may be 280° C. or lower, 270° C. or lower, or 250° C. or lower. When the thermoplastic resin has the melting point in the temperature range described above, the resin tends to generate less gas during molding.

The melting point is measured in accordance with a method described in the Examples below.

Furthermore, the thermoplastic resin fibers used in the present embodiment or in a thermoplastic resin composition serving as a raw material for the thermoplastic resin fibers may include various types of components, within a range that does not impair the object and effect of the present embodiment. For example, an additive can be added, and examples of such an additive include: fillers such as carbon nanotubes, stabilizers such as oxidation inhibitors and heat stabilizers, agents that improve the resistance to hydrolysis, weathering stabilizers, delustrants, ultraviolet absorbers, nucleating agents, plasticizers, dispersants, flame retardants, static inhibitors, discoloration inhibitors, gelation inhibitors, colorants, release agents, or a lubricant. For details of these additives, reference can be made to the descriptions in paragraphs [0130] to [0155] of JP 4894982 B, the contents of which are incorporated in the present specification.

In the present embodiment, an aspect is exemplified in which 80 mass % or more (preferably 90 mass % or more, more preferably 95 mass % or more, and even more preferably 98 mass % or more) of the thermoplastic resin fibers is a thermoplastic resin.

The thermoplastic resin fibers of the present embodiment are preferably thermoplastic resin fibers having a treatment agent for thermoplastic resin fibers on a surface thereof. When the thermoplastic resin fibers have the surface treatment agent, breakage of the thermoplastic resin fibers during the process of manufacturing of the commingled yarn and in subsequent processing steps can be suppressed.

Preferable examples of the surface treatment agent include ester-based compounds, alkylene glycol-based compounds, polyolefin-based compounds, phenyl ether-based compounds, polyether-based compounds, silicone-based compounds, polyethylene-based glycol compounds, amide-based compound, sulfonate-based compounds, phosphate-based compounds, carboxylate-based compounds, and combinations of two or more types thereof.

An amount of the surface treatment agent of the thermoplastic resin fibers is, for example, from 0.1 to 2.0 mass % of the thermoplastic resin fibers. A lower limit is preferably not less than 0.5 mass % and more preferably not less than 0.8 mass %. An upper limit is preferably not greater than 1.8 mass % and more preferably not greater than 1.5 mass %. When the amount of the surface treatment agent is in this range, dispersion of the thermoplastic resin fibers is improved.

For details of the surface treatment agent, reference can be made to the descriptions in paragraphs [0064] and [0065] of WO 2016/159340, the contents of which are incorporated in the present specification by reference.

A moisture content of the thermoplastic resin fibers used in the present embodiment, measured in accordance with JIS L 1096:2019, is preferably 6% or less, more preferably 5% or less, even more preferably 4% or less, yet even more preferably 3% or less, and still even more preferably 2% or less. A lower limit may be 0%, but 0.001% or higher is practical. When the moisture content of the thermoplastic resin fibers is 6% or less, foaming is less likely to occur during curing of the thermosetting resin, and slidability tends to further improve. Also, the thermoplastic resin fibers tend to become stronger through rubbing.

The moisture content of the thermoplastic resin fibers is measured according to the description in the Examples below.

An elastic modulus of the thermoplastic resin constituting the thermoplastic resin fibers used in the present embodiment is preferably 2000 MPa or higher, and more preferably 2500 MPa or higher. When the elastic modulus of thermoplastic resin is the lower limit value or higher, the obtained hose tends to be excellent in durability. Also, the elastic modulus of the thermoplastic resin may be 5000 MPa or less, or even 4000 MPa or less. When the elastic modulus is the upper limit or lower, the obtained hose tends to be excellent in flexibility.

The elastic modulus of the thermoplastic resin is a numeric value determined by drying an ISO test piece having a thickness of 4 mm for one hour at a temperature of 120° C., and then measuring in accordance with JIS K7161: 2019. The details are in accordance with the description in the Examples below.

When the hose of the present embodiment includes two or more types of thermoplastic resin fibers, the elastic modulus is a weight average value thereof.

In the hose of the present embodiment, of the mass of the hose, the thermoplastic resin fibers preferably account for 0.5 mass % or more and more preferably 1 mass % or more, and may account for 2 mass % or more, and also preferably accounts for 10 mass % or less and more preferably 8 mass % or less, and may account for 5 mass % or less.

In the present embodiment, the hose of the present embodiment may contain a single type of thermoplastic resin fibers, or may contain two or more types. When the hose of the present embodiment contains two or more types of thermoplastic resin fibers, the total amount thereof is preferably in the above range.

The thermosetting resin is described with reference again to FIG. 2.

The hose of the present embodiment has a thermosetting resin 24 external to the tube 21. The thermosetting resin 24 being present external to the tube 21 means that the thermosetting resin 24 is present external to the outer circumferential surface of the tube 21 and around the tube 21. Accordingly, the thermosetting resin 24 may be present on the surface of the outer circumferential surface of the tube 21, or may be present thereon with something interposed (for example, the thermoplastic resin fibers described below). The thermosetting resin 24 is usually applied from further outside than the continuous carbon fibers and/or continuous glass fibers 22, and then thermally cured and fixed to the hose.

In the present embodiment, at least a part of the thermosetting resin 24 is impregnated into the continuous carbon fibers and/or continuous glass fibers 22. The ratio of impregnation is preferably 90% or higher, and more preferably higher than 95%. With such a configuration, a hose is excellent in the flexibility and fatigue resistance. However, in the hose of the present embodiment, the effect can still be sufficiently exhibited even if the thermosetting resin 24 is impregnated only in a portion of the continuous carbon fibers and/or continuous glass fibers 22.

Furthermore, when the hose 20 according to the present embodiment includes the thermoplastic resin fibers 23 as illustrated in FIG. 2, the curable resin 24 is typically applied from further outside than the thermoplastic resin fibers 23 and then thermally cured. That is, the thermosetting resin 24 can be applied from further outside than a layer formed from the continuous carbon fibers and/or continuous glass fibers 22 and a layer formed from the thermoplastic resin fibers 23. In this case, some of the curable resin 24 is impregnated into the continuous carbon fibers and/or continuous glass fibers 22 and the thermoplastic resin fibers 23 and cured. With such a configuration, breakage of the continuous carbon fibers and/or continuous glass fibers can be more effectively suppressed, and a hose having excellent slidability is obtained.

The thermosetting resin used in the present embodiment has an elastic modulus from 0.5 to 10 MPa. With a resin having such an elastic modulus, a hose excelling in flexibility can be obtained, and fatigue fracture can be more effectively suppressed.

The elastic modulus of the thermosetting resin is preferably 0.8 MPa or higher, and more preferably 1.0 MPa or higher. With the thermosetting resin having the elastic modulus higher than the lower limit, resistance to fatigue fracture tends to excellent. Furthermore, the elastic modulus of the thermosetting resin may be 8 MPa or less, and further may be 5 MPa or less, 3 MPa or less, or 2 MPa or less. With the thermosetting resin having the elastic modulus less than the upper limit, the obtained hose tends to excel in flexibility.

The elastic modulus of the thermosetting resin is a numeric value determined by heating the thermosetting resin for 2 hours at the curing temperature of the thermosetting resin, subsequently subjecting to thermoregulation for two weeks under a condition of a temperature of 23° C. and a relative humidity of 55%, and then performing a measurement in accordance with JIS K7161:2019. The details are in accordance with the description in the Examples below.

When the hose of the present embodiment includes two or more types of thermosetting resins, the elastic modulus is defined as the elastic modulus of the mixture.

The curing temperature of the thermosetting resin used in the present embodiment is preferably 100° C. or higher, and more preferably 110° C. or higher. When the curing temperature is not less than the lower limit, the thermosetting resin tends to have a wider range of viscosity adjustment by heating, and tends to be impregnated more readily. In addition, the curing temperature of the thermosetting resin is preferably 180° C. or lower, and more preferably 170° C. or lower. When the curing temperature is not higher than the upper limit, the thermosetting resin tends to lead to better productivity.

hydrides, bisphenol F-type epoxy resins or their hydrides, bisphenol-type epoxy resins, novolac-type epoxy resins (such as phenol novolac-type epoxy resins, and cresol novolac-type epoxy resins), brominated epoxy resins (such as brominated bisphenol A-type epoxy resins), glycidyl ether-type epoxy resins (such as, for example, resins derived from a polyhydric alcohol, such as an alkylene oxide adduct of a polyol, and epihalohydrin), glycidyl ester-type epoxy resins, glycidyl amine-type epoxy resins, hydantoin-type epoxy resins, aliphatic epoxy resins, alicyclic epoxy resins, and phenol-type epoxy resins (such as resins derived from a polyhydric phenol, such as hydroquinone or catechol, and epihalohydrin). In addition, the epoxy resins described in paragraph [0069] of JP 2020-12092 A, the content of which is incorporated herein, can also be used.

The epoxy resin is preferably an epoxy resin represented by Formula (1) below, an epoxy resin represented by Formula (2) below, or an epoxy resin represented by Formula (3) below, and is more preferably an epoxy resin represented by Formula (3).

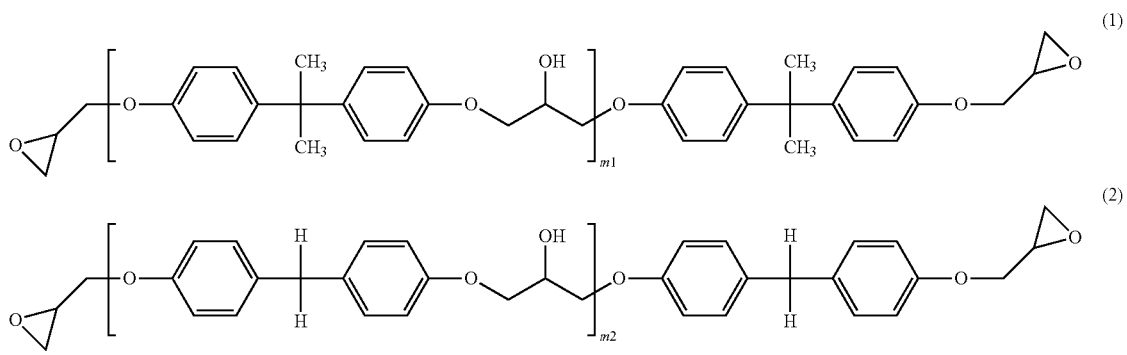

In the formulas, m1 and m2 are each independently a number of 0 or more, and as number averages, are preferably not less than 0.7, more preferably not less than 1, and even more preferably not less than 3. The upper limit is preferably 10 or less, more preferably 5 or less, and even more preferably 4 or less.

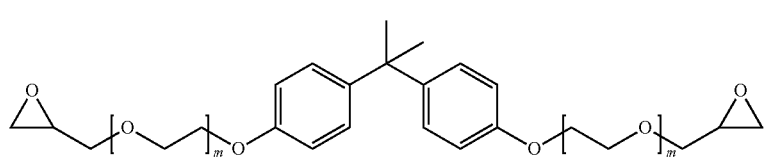

The method for measuring the curing temperature is in accordance with a method described in the Examples below.

When the hose of the present embodiment includes two or more types of thermosetting resins, the curing temperature is the curing temperature of the resin having the lowest curing temperature.

The thermosetting resin of the present embodiment is not particularly specified as long as the predetermined elastic modulus is satisfied, but examples include epoxy resins, urethane resins, unsaturated polyester resins, vinyl ester resins, and mixtures thereof, and epoxy resins are preferred.

Examples of epoxy resins that can be used in the present embodiment include bisphenol A-type epoxy resins or their (In formula (3), each m is independently an integer of 3 or more.)

The epoxy resin may contain an epoxy curing agent. Also, examples of the epoxy curing agent include the curing agents described in paragraphs [0071] to [0075] of JP 2020-12092 A, the content of which is incorporated herein. In the present embodiment, a diamine compound is preferable as the epoxy curing agent.

In the present embodiment, preferably, 50 mol % or more of the constituent components of the thermosetting resin are formed from an epoxy resin represented by Formula (3) below and a curing agent represented by Formula (4) below.

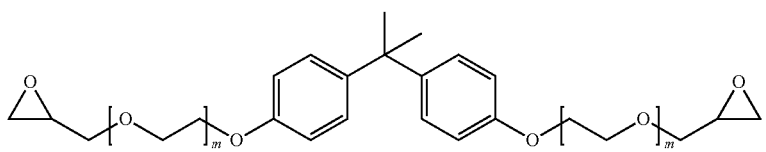

(3)

(In formula (3), each m is independently an integer of 3 or more)

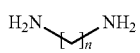

(4)

(In Formula (4), n is an integer of 6 or more.)

Each m is independently an integer of 3 or more, preferably an integer from 3 to 10, and more preferably an integer of 3 or 4.

Furthermore, n is an integer of 1 or more, and is preferably an integer from 6 to 10.

Moreover, the thermosetting resin used in the present embodiment may include a reaction diluent or a curing accelerator, and other components, and for details thereof, reference can be made to the descriptions in paragraphs [0069], [0076], and [0077] of JP 2020-12092 A, and the descriptions in paragraphs [0015]-[0018] of JP 2016-527384 T, the contents of which are incorporated herein.

In the hose of the present embodiment, of the mass of the hose, the thermosetting resin (including the curing agent) preferably accounts for 5 mass % or more and more preferably 7 mass % or more, and also preferably accounts for 30 mass % or less, more preferably 25 mass % or less, even more preferably 20 mass % or less, and yet even more preferably 17 mass % or less. When the content of the thermosetting resin (including the curing agent) is in such a range, the effect of the present invention tends to be more effectively exhibited.

In the present embodiment, a single type of thermosetting resin (including the curing agent) may be contained, or two or more types may be contained. When two or more types of thermosetting resins are contained, the total amount thereof is preferably in the above range.

Next, physical property values of each material, etc. constituting the hose of the present embodiment are described.

In the hose of the present embodiment, the thermoplastic resin constituting the thermoplastic resin fibers preferably has a melting point, and the melting point is preferably higher than the curing temperature of the thermosetting resin. When the melting point of the thermoplastic resin constituting the thermoplastic resin fibers is higher than the curing temperature of the thermosetting resin, even though the thermosetting resin is applied external to the layer constituted from the thermoplastic resin fibers and heated and cured, the thermoplastic resin fibers do not melt, and moldability of the hose tends to further improve.

Here, the difference between the melting point of the thermoplastic resin constituting the thermoplastic resin fibers and the curing temperature of the thermosetting resin is preferably 10° C. or more, more preferably 15° C. or more, and even more preferably 20° C. or more, and may be 50° C. or more, 65° C. or more, or 75° C. or more. When the difference thereof is equal to or more than the lower limit described above, the thermoplastic resin fibers tend to maintain the excellent physical properties. Also, the difference between the melting point of the thermoplastic resin constituting the thermoplastic resin fibers and the curing temperature of the thermosetting resin is preferably 250° C. or less, more preferably 200° C. or less, even more preferably 150° C. or less, yet even more preferably 100° C. or less, still even more preferably 90° C. or less, and further preferably 85° C. or less. When the difference is not greater than the upper limit described above, the obtained hose tends to be more stabilized.

The elastic modulus of the hose of the present embodiment is preferably 200 MPa or less, more preferably 150 MPa or less, even more preferably 100 MPa or less, and yet even more preferably 80 MPa or less. A lower limit of the elastic modulus of the hose is, for example, 10 MPa or higher.

Furthermore, in the hose of the present embodiment, the elastic modulus of the thermoplastic resin constituting the thermoplastic resin fibers is, in relation to the elastic modulus of the hose, preferably 200 times or less, more preferably 150 times or less, and even more preferably 100 times or less. When the elastic modulus of the thermosetting resin is not greater than the upper limit described above, the hose tends to show better slidability. Furthermore, the lower limit is, for example, preferably 15 times or more, and more preferably 20 times or more. When the elastic modulus of the thermosetting resin is not lower than the lower limit described above, the hose tends to have better flexibility.

The elastic modulus of the hose is a value determined by subjecting the hose to a tensile test under a condition of a distance between chucks of 60 mm and a rate of 20 mm/min, with other parameters being in accordance with JIS K7113: 2019. The details are in accordance with the description in the Examples below.

Furthermore, in the hose of the present embodiment, the elastic modulus of the thermoplastic resin constituting the thermoplastic resin fibers is, in relation to the elastic modulus of the thermosetting resin, preferably 5000 times or less, more preferably 4000 times or less, and even more preferably 3000 times or less. When the elastic modulus is not greater than the upper limit described above, the hose tends to have excellent slidability. The lower limit is, for example, preferably 2 times or more, more preferably 100 times or more, even more preferably 1000 times or more, still more preferably 1500 times or more, and yet even more preferably 2000 times or more. When the elastic modulus is not less than the lower limit describe above, the hose tends to have excellent fatigue characteristics.

In the hose of the present embodiment, when heated, the continuous carbon fibers and/or continuous glass fibers shrink, and the resin tube and the thermoplastic resin fibers tend to expand. Therefore, with the hose of the present embodiment, the difference in the linear expansion coefficients is preferably small. Such a configuration tends to deter development of a gap between the layers of the hose.

For example, after one hour of heating at the curing temperature of the thermosetting resin, the difference between the thermal shrinkage ratio of the thermoplastic resin and the thermal shrinkage ratio of the continuous carbon fibers and/or continuous glass fibers is preferably 2% or less, and more preferably 1.5% or less. The lower limit is preferably 0%. When the difference in the thermal shrinkage ratios is within the range described above, the hose tends to exhibit excellent responsiveness. When the hose of the present embodiment contains both continuous carbon fibers and continuous glass fibers, or when the hose of the present embodiment contains two or more types of carbon fibers and/or continuous glass fibers, at least one type thereof preferably satisfies the difference in shrinkage ratios described above, and more preferably, all of the carbon fibers and continuous glass fibers included in the hose satisfy the difference in shrinkage ratios.

In addition to the components described above, the hose of the present embodiment may also include various functional layers such as an ultraviolet radiation-resistant layer, a salt-resistant layer, another protective layer, and a design layer for enhancing the design properties. The functional layers are preferably formed by a resin, paint, metal foil, metal vapor deposition, or the like.

A length of the hose of the present embodiment is, for example, preferably 50 mm or longer, more preferably 100 mm or longer, and even more preferably 150 mm or longer. The length of the hose is also preferably not longer than 10000 mm, more preferably not longer than 900 mm, and even more preferably not longer than 800 mm.

An inner diameter of the hose of the present embodiment is typically the same as the inner diameter of the tube described above.

An outer diameter of the hose of the present embodiment is preferably 6 mm or larger, and also preferably 30 mm or smaller.

A thickness of the hose of the present embodiment is preferably 0.1 mm or more, more preferably 0.2 mm or more, and even more preferably 0.3 mm or more. The thickness of the hose is also preferably 20 mm or less, more preferably 15 mm or less, and even more preferably 10 mm or less.

The inner diameter, outer diameter, length, and thickness are number average values.

The hose of the present embodiment can be preferably used as a hose for a high-pressure fluid, a hose for a high-pressure gas, and a hose for pressure transmission. In particular, the hose of the present embodiment may be used widely in applications requiring a lightweight design and fatigue fracture resistance. Specifically, the hose of the present embodiment is used preferably as a brake hose or a hose for a hydraulic pump or a pneumatic device, or the like, and is particularly preferably used as a hose for a hydraulic pump.

Next, a manufacturing method of the present embodiment will be described.

The method for manufacturing a hose according to the present embodiment is characterized in that the method includes: winding continuous carbon fibers and/or continuous glass fibers around an outer circumference of a tube, an interior of the tube being hollow; applying a thermosetting resin from further outside than the continuous carbon fibers and/or continuous glass fibers, and impregnating the continuous carbon fibers and/or continuous glass fibers with at least a part of the thermosetting resin; and the thermosetting resin has an elastic modulus from 0.5 to 10 MPa.

The method for manufacturing a hose according to the present embodiment also preferably includes winding, external to the tube and external to the continuous carbon fibers and/or continuous glass fibers, a filamentous material containing thermoplastic resin fibers (preferably continuous thermoplastic resin fibers), and after the thermoplastic resin fibers have been wound, applying the thermosetting resin and impregnating the continuous carbon fibers and/or continuous glass fibers with at least a part of the thermosetting resin.

In a related art, a tube is externally reinforced with continuous reinforcing fibers, and the exterior is further covered with a hose or tube made of polypropylene resin or polyacetal resin. However, in the present embodiment, the number of steps can be reduced by winding the thermoplastic resin fibers around the outer circumference of the continuous carbon fibers and/or continuous glass fibers. Furthermore, a hose with excellent slidability can be obtained by wrapping with the thermoplastic resin fibers.

In the method for manufacturing the hose according to the present embodiment, as the method for impregnating the continuous carbon fibers and/or continuous glass fibers with the thermosetting resin, for example, a tube can be wrapped with the continuous carbon fibers and/or continuous glass fibers, and as necessary, thermoplastic resin fibers, and the resulting product can then be immersed in a thermosetting resin prior to curing, and then heated and cured. Alternatively, the continuous carbon fibers and/or continuous glass fibers, and as necessary, the thermoplastic resin fibers are impregnated in advance with a thermosetting resin, and this impregnated fibers can be wound around the tube, and then heated and cured. Alternatively, continuous carbon fibers and/or continuous glass fibers, and as necessary, thermoplastic resin fibers can be wound around a tube which has been immersed in a thermosetting resin prior to curing, and pressure may then be applied to this wound piece using a roller or the like. By employing such a means, excess thermosetting resin can be removed, and the continuous carbon fibers and/or continuous glass fibers can be easily impregnated.

In method for manufacturing the hose according to the present embodiment, the curing temperature of the thermosetting resin is preferably lower than the melting point of the thermoplastic resin constituting the thermoplastic resin fibers. By employing such a configuration, even when the thermosetting resin is applied to the surface of the thermoplastic resin fibers and cured, the fibrous shape of the thermoplastic resin fibers can be maintained.

In the method of manufacturing a hose according to the present embodiment, a moisture content of the thermoplastic resin fibers measured in accordance with JIS L 1096:2019 is preferably 6% or less. When such thermoplastic resin fibers having a low moisture content is wound, a hose having better water resistance can be produced, and air bubbles do not easily enter into the hose after curing. The details of the moisture content are the same as those of the moisture content described with regard to the hose above.

The tube, the continuous carbon fibers and/or continuous glass fibers, and the thermoplastic resin fibers used in the method for manufacturing a hose according to the present embodiment, and also other details are the same as those described in the explanation of the hose described above.

In addition, with regard to the hose and the method for manufacturing the hose of the present embodiment, within a range that does not depart from the spirit of the present invention, reference can be made to the descriptions of JP 2001-241570 A, JP 63-015734 A, and JP 01-195026 A, the contents of which are incorporated herein.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

1. Raw Material

Tube

Resin Tube 1: TB-6.0B available from Denka Electron Co., Ltd. (made of PVC, inner diameter (diameter) of 6 mm, outer diameter (diameter) of 6.9 mm, thickness of 0.45 mm)

Resin Tube 2: TOMBO No. 9003-PTFE available from Nichias Corporation (made of PTFE, inner diameter (diameter) of 7 mm, outer diameter (diameter) of 9 mm, thickness of 1 mm)

<Continuous Reinforcing Fibers>

Continuous carbon fibers: Pyrofil-TR-50S-6000-AD available from Mitsubishi Chemical Corporation, 4000 dtex, fiber count of 6000 f, surface-treated with an epoxy resin.

Continuous glass fibers: F-165 available from Nippon Electric Glass Co., Ltd., 5750 dtex, fiber count of 1600 f Continuous stainless steel fiber: Stainless steel wire MS-K1420 available from Maxtel Co., Ltd., combination of two 1.4 mm diameter wires.

<Thermosetting Resin>

Epoxy resin 1: ARE-ST-01 available from Kitamura Chemicals Co., Ltd.

Epoxy resin 2: EF-28 available from Sanyu Rec, Ltd.

Epoxy resin 3: jER-828/jER YH-306 available from Mitsubishi Chemical Corporation Thermoplastic Resin MP10: A polyamide resin synthesized according to the synthesis example described below, melting point of 213° C.

PA6: polyamide resin 6, 1022B available from Ube Industries, Ltd., melting point of 220° C.

Polyimide 1: Thermoplastic polyimide resin synthesized according to the synthesis example described below, melting point of 323° C.

MP10 Synthesis Example

A reaction vessel equipped with a stirrer, a partial condenser, a total condenser, a thermometer, a dropping funnel, a nitrogen introduction tube, and a strand die was charged with 10 kg (49.4 mol) of sebacic acid (TA grade, available from Itoh Oil Chemicals Co., Ltd.) and 11.66 g of sodium acetate/sodium hypophosphite monohydrate (molar ratio=1/1.5), and after sufficient nitrogen purging, the mixture was heated to 170° C. and melted while the system was stirred under a small nitrogen stream.

Under stirring, 6.647 kg of a mixed xylylenediamine in which the molar ratio of m-xylylenediamine (available from Mitsubishi Gas Chemical Company, Inc.) and p-xylylenediamine (available from Mitsubishi Gas Chemical Company, Inc.) was 70/30 (34.16 mol of m-xylylenediamine, 14.64 mol of p-xylylenediamine) was added dropwise to the molten sebacic acid while the condensed water generated was discharged out of the system, and the internal temperature was continuously increased to 240° C. over 2.5 hours.

After dropwise addition was completed, the internal temperature was increased, and when the temperature reached 250° C., the pressure inside the reaction vessel was reduced. The internal temperature was then further increased, and the melt polycondensation reaction was continued for 20 minutes at 255° C. Next, the inside of the system was pressurized with nitrogen, and the obtained polymer was discharged from the strand die and pelletized to produce a polyamide resin MP10.

The melting point of the obtained MP10 was 213° C., and the number average molecular weight was 15400.

Synthesis Example of Polyimide 1

An amount of 600 g of 2-(2-methoxyethoxy)ethanol (available from manufactured by Nippon Nyukazai Co., Ltd.) and 218.58 g (1.00 mol) of pyromellitic dianhydride (available from Mitsubishi Gas Chemical Co., Inc.) were introduced into a 2-L separable flask equipped with a Dean-Stark apparatus, a Liebig condenser, a thermocouple, and four paddle blades, and then subjected to a nitrogen flow, after which the contents were stirred at 150 rpm to produce a homogeneous suspension solution. Meanwhile, 49.42 g (0.347 mol) of 1,3-bis(aminomethyl)cyclohexane (available from Mitsubishi Gas Chemical Co., Inc.) and 93.16 g (0.645 mol) of 1,8-octamethylenediamine (available from Kanto Chemical Co., Inc.) were dissolved in 250 g of 2-(2-methoxyethoxy)ethanol in a 500 mL beaker, and a mixed diamine solution was prepared. The mixed diamine solution was then gradually added using a plunger pump. Dropwise addition of the mixed diamine solution was implemented entirely under nitrogen flow, and the rotational speed of the stirring blades was set to 250 rpm. Once the dropwise addition was completed, 130 g of 2-(2-methoxyethoxy) ethanol and 1.934 g (0.0149 mol) of n-octylamine (available from Kanto Chemical Co., Inc.) were added, and the mixture was further stirred. At this stage, a pale yellow polyamic acid solution was obtained. Next, the stirring speed was adjusted to 200 rpm, after which the polyamic acid solution in the 2 L separable flask was heated to 190° C. In the course of heating, precipitation of a polyimide resin powder and dehydration associated with imidization were confirmed while the liquid temperature was in a range from 120 to 140° C. The temperature was maintained at 190° C. for 30 minutes, after which the solution was cooled to room temperature and then filtered. The obtained polyimide resin powder was washed with 300 g of 2-(2-methoxyethoxy) ethanol and 300 g of methanol and filtered, and then dried in a dryer for 10 hours at 180° C., and 316 g of a powder of a polyimide 1 was obtained.

Continuous Thermoplastic Resin Fibers/Commingled Yarn

Method for Manufacturing Resin Fibers 1 to 3

Each of the thermoplastic resins shown in Table 1 and Table 2 was melt-extruded using a single-screw extruder having a screw with a diameter of 30 mm, extruded into a strand form from a 60-hole die, and stretched while being wound with a roll, and 800 m of a fiber bundle of continuous thermoplastic resin fibers was wound onto a core, and a wound body was obtained. The melting temperature was set to a temperature that was 15° C. higher than the melting point of the thermoplastic resin constituting the thermoplastic resin fibers. A fiber bundle of 300 denier (D) was obtained. Five of the obtained fiber bundles were combined and twisted.

Method for Manufacturing Commingled Yarn 1

A deep vat was filled with an oil agent (polyoxyethylene hydrogenated castor oil (EMANON 1112, available from Kao Corporation)), a roller having a rubber-treated surface was installed to bring a lower portion of the roller into contact with the oil agent, and thus the oil agent was constantly adhered to the roller surface by rotating the roller. The oil agent was applied to the surface of the obtained resin fibers 1 by bringing the resin fibers 1 into contact with this roller, and then the coated resin fibers 1 were wound onto a core.

Each fiber was drawn from the wound body of the resin fibers 1 coated with oil agent and from the wound body of the continuous carbon fibers and was opened by air blowing while the fiber was being passed through a plurality of guides. While being opened, the resin fibers 1 and the continuous carbon fibers were formed into a single bundle, and the bundle was further subjected to air blowing while being passed through a plurality of guides to increase the uniformity of the bundle, and a commingled yarn 1 was obtained.

2. Physical Property Values

Thermal Shrinkage Ratio of Continuous Reinforcing Fibers

The continuous reinforcing fiber was cut to approximately 5 cm and heated for 1 hour at the curing temperature of the respective thermosetting resins described in Table 1 or Table 2, and the thermal shrinkage ratio was determined as follows.

Thermal shrinkage ratio={[(length of the continuous reinforcing fiber before heating)−(length of the continuous reinforcing fiber after heating)]/ (length of continuous reinforcing fiber before heating)}×100

The thermal shrinkage ratio was expressed in units of %.

Method for Measuring Elastic Modulus of Thermosetting Resin

The elastic modulus of the thermosetting resin was determined by heating the thermosetting resin for 2 hours at the curing temperature of the thermosetting resin, subsequently subjecting to thermoregulation for two weeks under a condition of a temperature of 23° C. and a relative humidity of 55%, and then performing a measurement in accordance with JIS K7161:2019.

The elastic modulus was expressed in units of MPa.

Curing Temperature of Thermosetting Resin

The exothermic peak observed using a differential scanning calorimeter (DSC) when heated at a temperature increase rate of 5° C./min was defined as the curing temperature.

The curing temperature was expressed in units of ° C.

Method for Measuring Moisture Content of Thermoplastic Resin Fibers

The moisture content of the surface-treated thermoplastic resin fibers was measured in accordance with JIS L1096: 2019.

The thermal shrinkage ratio was expressed in units of %.

Snag Resistance of Thermoplastic Resin Fibers

An evaluation score according to a snag test was determined by measuring a knitted product of the thermoplastic resin fibers in accordance with the JIS L 1058:2019 D-1 method.

Here, a test cloth produced by knitting a combination of three thermoplastic resin fiber bundles of 50 denier/36 filaments, using an 18-gauge tubular knitting machine, was used as the knitted product.

Method for Measuring Melting Point of Thermoplastic Resin

To measure the melting point of the thermoplastic resin, a differential scanning calorimeter (DSC) was used to determine the melting point from a temperature at which the observed endothermic peak reached a maximum peak when approximately 1 mg of a sample was heated and melted from room temperature to a temperature equal to or higher than the anticipated melting point at a temperature increase rate of 10° C./min while nitrogen was streamed at 30 mL/min as an atmosphere gas.

The melting point was expressed in units of ° C.

As the differential scanning calorimeter (DSC), the DSC-60 available from Shimadzu Corporation was used.

Elastic Modulus of Thermoplastic Resin Fibers

A 4 mm thick ISO test piece was dried at 120° C. for 1 hour, after which the elastic modulus was measured in accordance with JIS K7161:2019.

Specifically, a 4-mm thick ISO test piece was molded using the injection molding machine 100T available from Fanuc Corporation under the molding condition for an injection molded article. The injection temperature during molding was set to 280° C. for the polyamide resin and 350° C. for the polyimide resin.

The test pieces produced as above were dried at 120° C. for 1 hour, after which the elastic modulus was measured in accordance with JIS K7161:2019.

The elastic modulus is expressed in units of MPa.

Thermal Shrinkage Ratio of Thermoplastic Resin Fibers

The thermoplastic resin fiber was cut to approximately 5 cm and heated for 1 hour at the curing temperature of the respective thermosetting resins described in Table 1 or Table 2, and the thermal shrinkage ratio was determined as follows.

Thermal shrinkage ratio={[(length of the thermoplastic resin fiber before heating)−(length of the thermoplastic resin fiber after heating)]/(length of the thermoplastic resin fiber before heating)}×100

The thermal shrinkage ratio is expressed in units of %.

3. Examples and Comparative Examples

Example 1

Method for Manufacturing Hose

As illustrated in FIG. 2, the continuous reinforcing fibers (carbon fibers) listed in Table 1 were set in a braiding machine (available from Fujimoto Corporation) such that the number of braided yarns was 48, and while a braid was produced, the braid was wound at an of angle ±55 degrees in relation to the axial direction of the tube (resin tube 1) and around the tube twice in S-direction. Next, the continuous thermoplastic resin fibers (resin fibers 1) listed in Table 1 were set in the braiding machine such that the number of units constituting the braid was 48, and the braid was wound around the outer circumference of the continuous reinforcing fibers at an angle of ±55 degrees in relation to the axial direction of the tube and once in the S-direction.

Subsequently, using a SK-7 type unisizer (available from Kaji Seisakusho Co., Ltd.), the hose was immersed in a thermosetting resin (epoxy resin 1) listed in Table 1, and the excess thermosetting resin was removed, after which the hose was dried in a drying furnace for two hours at the curing temperature. After the thermosetting resin was cured, the hose was wound. The length of the obtained hose was 10 m.

The obtained hose was evaluated as follows.

Ratio of Impregnation of Thermosetting Resin

Impregnation of the thermosetting resin into the continuous reinforcing fibers was confirmed in the following manner.

A sample with 3 cm length was cut from the hose in the longitudinal direction, the outer circumference was wrapped with a rubber tape, and the fibers were fixed. A cross section perpendicular to the longitudinal direction of the fixed hose was polished, and an image of the cross section was captured using an ultra-deep color 3D shape-measuring microscope. In the obtained cross-sectional image, regions of impregnation were selected using the image analysis software ImageJ, and the surface area was measured. The ratio of impregnation was expressed as a ratio of the (surface area of the region of impregnation)/(cross-sectional area of the braid portion) (unit in %).

The region of impregnation refers to a region in which the thermosetting resin fibers penetrate between continuous carbon fibers and/or continuous glass fibers and thermoplastic resin fibers such that air between the fibers is removed. That is, in the region of impregnation, cured thermosetting resin is present between the continuous carbon fibers and/or continuous glass fibers, and the thermoplastic resin fibers.

As the ultra-deep color 3D shape-measuring microscope, the VK-9500 (controller section)/VK-9510 (measurement section) (available from Keyence Corporation) was used.

Method for Measuring Elastic Modulus of Hose

A 200 mm sample was cut from the obtained hose, and the elastic modulus of the hose was measured as follows.

A chuck having a shape capable of holding the cut hose was used, and the elastic modulus of the hose was determined by subjecting the cut hose to a tensile test under a condition of a distance between chucks of 60 mm and a rate of 20 mm/min with other parameters being in accordance with JIS K7113:2019.

The elastic modulus was expressed in units of MPa.

Evaluation of Responsiveness

The hose was mounted on a Lancer Evolution X (available from Mitsubishi Motors Corp.), and the effectiveness and speed of response to stepping on the brake pedal were evaluated as follows. Ten experts conducted the evaluation, and the responsiveness and effectiveness were decided by a majority vote.

A: The response speed and effectiveness were extremely good.

B: The evaluator felt a slight time lag in the response speed to stepping on the brakes in comparison to A.

C: The evaluator felt a time lag in the response speed to stepping on the brakes, and the effectiveness was poor, in comparison to A.

Presence or Absence of Breakage of Continuous Reinforcing Fibers

Using a scrape wear tester (ET015-001 available from Yuasa System Co., Ltd.) and a needle having a needle diameter of 45 mm and made from SUS316 as the needle material, the hose was tested for one minute under a condition of 20 cycles/minute, a needle movement amount of 20 mm, and a temperature of 23° C. After the test, the presence or absence of breakage of continuous reinforcing fibers in the hose was confirmed using an X-ray CT-scanner (TDM 1000H-II, available from Yamato Scientific Co., Ltd.), and the hoses were evaluated as follows. Ten experts conducted the evaluation, and the presence or absence of breakage was decided by a majority vote.

A: The continuous reinforcing fibers did not break.

B: The continuous reinforcing fibers broke.

Slidability of Hose

Two 50 cm long samples were cut from the hose, and the two samples were overlaid horizontally on their centers such that they intersect at an angle of 45 degrees, and the lower hose was fixed. An evaluator held the end of the upper hose by hand and moved the upper hose by 10 cm in the longitudinal direction, and the slidability was evaluated as follows. Ten experts (evaluators) conducted the evaluation, and the slidability was decided by a majority vote.

A: The upper hose moved without getting caught.

B: When the upper hose was moved, vibration of less than 1 mm occurred due to catching of the hose.

C: When the upper hose was moved, vibration of 1 mm or more occurred due to catching of the hose.

Flexibility

The flexibility was evaluated from the radius of curvature r (outer diameter, mm) when the hose was bent to the breakage limit. The bending time was 5 seconds. Five experts conducted the evaluation, and the number average value was used as the radius of curvature.

A: $40 > r$

B: $40 \leq r < 45$

C: $45 \leq r < 50$

D: $50 \leq r$

Fatigue Test

The fatigue test of the hose was implemented by measuring the tensile fatigue fracture. Specifically, using a fatigue tester, the hose was subjected to a fatigue test in accordance with JIS K 7118:2019 in a tensile test mode and at a frequency of 10 Hz, a repetitive stress amplitude of 10 MPa, and a temperature of 23° C.

The ElectroPlus-E1000 (available from Instron Corporation) was used as the fatigue tester. Ten experts conducted the evaluation, and the fatigue was decided by a majority vote.

The fatigue was evaluated as follows.

A: Remarkably harder to break than the hose of Comparative Example 1

B: Slightly harder to break than the hose of Comparative Example 1

C: Hose of Comparative Example 1

D: Slightly easier to break than the hose of Comparative Example 1

E: Much easier to break than the hose of Comparative Example 1

Water Resistance

The hose was immersed in water at 23° C. for 1 week, and dimensional changes were evaluated as follows. Ten experts conducted the evaluation, and the water resistance was decided by a majority vote.

A: Little or no change in the dimensions

B: Other than A (such as significant dimensional changes)

Lightweight Property

The mass of 10 cm of the hose was measured, and the unit weight (g/cm) was calculated. The lightweight property was evaluated as follows from a unit mass ratio when the mass of Example 2 was taken as 1, which used no thermoplastic resin fiber and had the lightest weight.

A: 1.0 or more and less than 1.1

B: 1.1 or more and less than 1.4

C: 1.4 or more and less than 1.7

D: 1.7 or more

Examples 2 to 8, Comparative Examples 1 and 2, Reference Example

Examples 2 to 8, Comparative Examples 1 and 2, and a Reference Example were prepared in the same manner as Example 1 with the exception that the type of tube, the presence or absence and type of continuous reinforcing fibers, the type of thermosetting resin, and the presence or absence and type of thermoplastic resin fibers were changed as indicated in Table 1 or Table 2.

TABLE 1

| | | Example 1 | Example 2 | Example 3 | Example 4 | Example 5 | Example 6 |
|---|---|---|---|---|---|---|---|
| Tube | Material | Resin tube 1 | Resin tube 1 | Resin tube 1 | Resin tube 1 | Resin tube 1 | Resin tube 1 |
| Continuous reinforcing fiber | Type | Carbon fiber | Carbon fiber | Carbon fiber | Carbon fiber | Carbon fiber | Carbon fiber |
| | Thermal shrinkage ratio (%) | 0 | 0 | 0 | 0 | 0 | 0 |
| | Percentage in hose (mass %) | 14 | 16 | 15 | 14 | 14 | 14 |
| Thermosetting resin | Type | Epoxy resin 1 | Epoxy resin 1 | Epoxy resin 1 | Epoxy resin 1 | Epoxy resin 1 | Epoxy resin 2 |
| | Elastic modulus (MPa) | 1.2 | 1.2 | 1.2 | 1.2 | 1.2 | 9 |
| | Curing temperature (° C.) | 130 | 130 | 130 | 130 | 130 | 150 |
| | Percentage in hose (mass %) | 14 | 10 | 14 | 14 | 14 | 14 |
| Type of continuous thermoplastic resin fibers/commingled yarn | | Resin fiber 1 | Not used | Commingled yarn 1 | Resin fiber 2 | Resin fiber 3 | Resin fiber 1 |
| Thermoplastic resin fiber | Moisture content (%) | 1.7 | — | 1.7 | 4.8 | 1 | 1.7 |
| | Snag resistance | 3.5 | — | 3.5 | 3.5 | 2.5 | 3.5 |
| | Type of thermoplastic resin | MP10 | Not used | MP10 | PA6 | Polyimide 1 | MP10 |
| | Melting point of thermoplastic resin (° C.) | 213 | — | 213 | 220 | 323 | 213 |
| | Elastic modulus (MPa) | 3070 | — | 3070 | 3130 | 2600 | 3070 |
| | Thermal shrinkage ratio (%) | 1 | — | 1 | 1.1 | 0.5 | 1 |
| | Percentage in hose (mass %) | 4 | — | 3 | 4 | 3 | 3 |
| Evaluation | Ratio of impregnation (%) | 100 | 99 | 100 | 100 | 100 | 100 |
| | Elastic modulus of hose (MPa) | 40 | 59 | 45 | 38 | 41 | 121 |
| | Responsiveness | A | A | A | A | A | A |
| | Presence/absence of breakage in continuous reinforcing fibers | A | B | A | A | A | A |
| | Slidability of hose | A | C | B | A | A | A |
| | Flexibility | A | A | A | A | A | B |
| | Fatigue test | A | A | A | A | A | A |
| | Water resistance | A | A | A | B | A | A |
| | Lightweight property | A | A | A | A | A | A |

TABLE 2

| | | Example 7 | Example 8 |
|---|---|---|---|
| Tube | Material | Resin Tube 2 | Resin tube 1 |
| Continuous reinforcing fiber | Type | Carbon fiber | Glass fiber |
| | Thermal shrinkage ratio (%) | 0 | 0.1 |
| | Percentage in hose (mass %) | 9 | 19 |
| Thermosetting resin | Type | Epoxy resin 1 | Epoxy resin 1 |
| | Elastic modulus (MPa) | 1.2 | 1.2 |
| | Curing temperature (° C.) | 130 | 130 |

TABLE 2-continued

|  |  |  |  |
|---|---|---|---|
|  | Percentage in hose (mass %) | 9 | 13 |
| Type of continuous thermoplastic resin fibers/commingled yarn |  | Resin fiber 1 | Resin fiber 1 |
| Thermoplastic resin fiber | Moisture content (%) | 1.7 | 1.7 |
|  | Snag resistance | 3.5 | 3.5 |
|  | Type of thermoplastic resin | MP10 | MP10 |
|  | Melting point of thermoplastic resin (° C.) | 213 | 213 |
|  | Elastic modulus (MPa) | 3070 | 3070 |
|  | Thermal shrinkage ratio (%) | 1 | 1 |
|  | Percentage in hose (mass %) | 3 | 4 |
| Evaluation | Ratio of impregnation (%) | 100 | 100 |
|  | Elastic modulus of hose (MPa) | 22 | 45 |
|  | Responsiveness | A | B |
|  | Presence/absence of breakage in continuous reinforcing fibers | A | A |
|  | Slidability of hose | A | A |
|  | Flexibility | A | A |
|  | Fatigue test | A | B |
|  | Water resistance | A | A |
|  | Lightweight property | A | B |

|  |  | Comparative Example 1 | Comparative Example 2 | Reference Example |
|---|---|---|---|---|
| Tube | Material | Resin tube 1 | Resin tube 1 | Resin tube 1 |
| Continuous reinforcing fiber | Type | Carbon fiber | Stainless steel fibers | — |
|  | Thermal shrinkage ratio (%) | 0 | 0.3 | — |
|  | Percentage in hose (mass %) | 14 | 42 | 0 |
| Thermosetting resin | Type | Epoxy resin 3 | Epoxy resin 1 | — |
|  | Elastic modulus (MPa) | 1800 | 1.2 | — |
|  | Curing temperature (° C.) | 180 | 130 | — |
|  | Percentage in hose (mass %) | 14 | 9 | — |
| Type of continuous thermoplastic resin fibers/commingled yarn |  | Resin fiber 1 | Resin fiber 1 | — |
| Thermoplastic resin fiber | Moisture content (%) | 1.7 | 1.7 | — |
|  | Snag resistance | 3.5 | 3.5 | — |
|  | Type of thermoplastic resin | MP10 | MP10 | — |
|  | Melting point of thermoplastic resin (° C.) | 213 | 213 | — |
|  | Elastic modulus (MPa) | 3070 | 3070 | — |
|  | Thermal shrinkage ratio (%) | 1 | 1 | — |
|  | Percentage in hose (mass %) | 4 | 3 | — |
| Evaluation | Ratio of impregnation (%) | 100 | 100 | — |
|  | Elastic modulus of hose (MPa) | 245 | 2100 | 10 |
|  | Responsiveness | A | A | C |
|  | Presence/absence of breakage in continuous | A | A | — |

TABLE 2-continued

|  |  |  |  |
|---|---|---|---|
| reinforcing fibers |  |  |  |
| Slidability of hose | C | C | C |
| Flexibility | D | C | A |
| Fatigue test | D | C | A |
| Water resistance | A | A | A |
| Lightweight property | A | D | A |

As is clear from the results described above, the hose of the present invention exhibited a low elastic modulus and excellent flexibility and effectively suppressed fatigue fracture.

Furthermore, breakage of the continuous reinforcing fibers in the hose of the present invention was suppressed. The hose of the present invention also excelled in water resistance and a lightweight property.

In addition, in comparison to a case in which continuous stainless steel fibers were used in place of the continuous carbon fibers, a weight reduction of up to 60% was successfully achieved.

REFERENCE SIGNS LIST

11 Stainless steel mesh hose
12 Body
13 Connector
20 Hose
21 Tube
22 Continuous carbon fiber and/or continuous glass fiber
23 Continuous thermoplastic resin fiber
24 Thermosetting resin
31 Internal pressure
32 Tensile force

The invention claimed is:

1. A hose comprising: a tube, an interior of the tube being hollow; continuous carbon fibers and/or continuous glass fibers wound around an outer circumference of the tube; and a thermosetting resin present external to the tube,
   the thermosetting resin having an elastic modulus from 0.5 to 10 MPa, and
   the continuous carbon fibers and/or continuous glass fibers being impregnated with at least a part of the thermosetting resin; wherein
   an elastic modulus of the thermosetting resin is a numeric value determined by: heating the thermosetting resin for 2 hours at a curing temperature of the thermosetting resin; subsequently subjecting the thermosetting resin to thermoregulation for two weeks under a condition of a temperature of 23° C. and a relative humidity of 55%; and then performing a measurement in accordance with JIS K7161:2019; and
   thermoplastic resin fibers wound around an outer circumference of the continuous carbon fibers and/or continuous glass fibers.

2. The hose according to claim 1, wherein when a thermoplastic resin constituting the thermoplastic resin fibers is measured by a differential scanning calorimeter, the thermoplastic resin has a melting point, and the melting point is 180° C. or higher.

3. The hose according to claim 1, wherein an evaluation score according to a snag test of the thermoplastic resin fibers is 2 or higher, the evaluation score according to the snag test being a numeric value obtained by measuring a knitted product of the thermoplastic resin fibers in accordance with the JIS L 1058:2019 D-1 method, and the knitted product being a test cloth produced using an 18-gauge tubular knitting machine from a combination of three thermoplastic resin fiber bundles of 50 denier/36 filaments.

4. The hose according to claim 1, wherein the thermoplastic resin fibers are wound around a surface of the continuous carbon fibers and/or the continuous glass fibers.

5. The hose according to claim 1, wherein as a commingled yarn including the thermoplastic resin fibers and continuous reinforcing fibers, the thermoplastic resin fibers are wound around the outer circumference of the continuous carbon fibers and/or the continuous glass fibers.

6. The hose according to claim 1, wherein the thermoplastic resin constituting the thermoplastic resin fibers includes a polyamide resin.

7. The hose according to claim 1, wherein the thermoplastic resin constituting the thermoplastic resin fibers includes a polyamide resin constituted from a constituent unit derived from a diamine and a constituent unit derived from a dicarboxylic acid, 50 mol % or more of the constituent units derived from a diamine being derived from xylylene diamine.

8. The hose according to claim 1, wherein an elastic modulus of the thermoplastic resin constituting the thermoplastic resin fibers is from 15 times to 200 times an elastic modulus of the hose; the elastic modulus of the hose being a value determined by subjecting the hose to a tensile test under a condition of a distance between chucks of 60 mm and a rate of 20 mm/min, with other conditions being in accordance with JIS K7113:2019, and the elastic modulus of the thermoplastic resin being a numeric value determined by: drying an ISO test piece having a thickness of 4 mm for one hour at a temperature of 120° C.; and then performing a measurement in accordance with JIS K7161:2019.

9. The hose according to claim 1, wherein an elastic modulus of the thermoplastic resin constituting the thermoplastic resin fibers is 5000 times or less an elastic modulus of the thermosetting resin;
   the elastic modulus of the thermoplastic resin being a numeric value obtained by drying an ISO test piece having a thickness of 4 mm for one hour at a temperature of 120° C., and then performing a measurement in accordance with JIS K7161:2019.

10. The hose according to claim 1, wherein after one hour of heating at a curing temperature of the thermosetting resin, a difference between a thermal shrinkage ratio of the thermoplastic resin fibers and a thermal shrinkage ratio of the continuous carbon fibers and/or continuous glass fibers is 2% or less.

11. The hose according to claim 1, wherein the thermosetting resin includes an epoxy resin.

12. The hose according to claim 1, wherein the tube is a resin tube.

13. The hose according to claim 1, wherein the continuous carbon fibers and/or continuous glass fibers are wound in a braided state around the outer circumference of the tube.

14. A method for manufacturing a hose, the method comprising:
- winding continuous carbon fibers and/or continuous glass fibers around an outer circumference of a tube, an interior of the tube being hollow;
- applying a thermosetting resin from further outside than the continuous carbon fibers and/or continuous glass fibers, and impregnating the continuous carbon fibers and/or continuous glass fibers with at least a part of the thermosetting resin; and
- winding thermoplastic resin fibers around an outer circumference of the continuous carbon fibers and/or continuous glass fibers, wherein
- the thermosetting resin has an elastic modulus from 0.5 to 10 MPa; and
- the elastic modulus of the thermosetting resin is a numeric value determined by: heating the thermosetting resin for 2 hours at a curing temperature of the thermosetting resin; then subjecting the thermosetting resin to thermoregulation for two weeks under a condition of a temperature of 23° C. and a relative humidity of 55%; and then performing a measurement in accordance with JIS K7161:2019.

15. The method for manufacturing a hose according to claim 14, wherein after the thermoplastic resin fibers have been wound, applying the thermosetting resin and impregnating the continuous carbon fibers and/or continuous glass fibers with at least a part of the thermosetting resin.

16. The method for manufacturing a hose according to claim 15, wherein when a thermoplastic resin constituting the thermoplastic resin fibers is measured by a differential scanning calorimeter, the thermoplastic resin has a melting point, and a curing temperature of the thermosetting resin is lower than the melting point of the thermoplastic resin constituting the thermoplastic resin fibers.

17. The method for manufacturing a hose according to claim 15, wherein a moisture content of the thermoplastic resin constituting the thermoplastic resin fibers, measured in accordance with JIS L 1096:2019, is 6% or less.

18. A hydraulic pump comprising a hose described in claim 1.

* * * * *